US011473966B2

(12) United States Patent
Oda

(10) Patent No.: US 11,473,966 B2
(45) Date of Patent: Oct. 18, 2022

(54) ELECTRONIC BALANCE

(71) Applicant: A&D COMPANY, LIMITED, Tokyo (JP)

(72) Inventor: Hisanori Oda, Saitama (JP)

(73) Assignee: A&D COMPANY, LIMITED, Tokyo (JP)

( * ) Notice: Subject to any disclaimer, the term of this patent is extended or adjusted under 35 U.S.C. 154(b) by 458 days.

(21) Appl. No.: 16/646,474

(22) PCT Filed: Dec. 19, 2018

(86) PCT No.: PCT/JP2018/046813
§ 371 (c)(1),
(2) Date: Mar. 11, 2020

(87) PCT Pub. No.: WO2020/129191
PCT Pub. Date: Jun. 25, 2020

(65) Prior Publication Data
US 2021/0156732 A1    May 27, 2021

(51) Int. Cl.
*G01G 21/28*         (2006.01)
(52) U.S. Cl.
CPC ...... *G01G 21/286* (2013.01); *E05Y 2201/454* (2013.01); *E05Y 2400/40* (2013.01); *E05Y 2400/44* (2013.01); *E05Y 2900/60* (2013.01)
(58) Field of Classification Search
CPC ..... G01G 21/28; E05F 15/56; E05Y 2400/40; E05Y 2400/44; E05Y 2900/60; E05Y 2201/458; E05Y 2201/454

(Continued)

(56) References Cited

U.S. PATENT DOCUMENTS 5,298,688 A    3/1994  Luechinger et al.
5,379,923 A    1/1995  Sagastegui et al.
(Continued)

FOREIGN PATENT DOCUMENTS

JP    5-62824       8/1993
JP    5-62825 U     8/1993
(Continued)

*Primary Examiner* — Jacques M Saint Surin
(74) *Attorney, Agent, or Firm* — Calderon Safran & Cole P.C.

(57) ABSTRACT

Provided is a balance with a windshield having a door to be smoothly opened and closed either manually or automatically. Provided is an electronic balance with a windshield including a balance main body including a weighing mechanism connected to a weighing pan, a windshield having doors capable of opening and closing by sliding, and configured to form a weighing chamber by covering the weighing pan, and actuators configured to open and close the doors, wherein the actuator includes a double-acting type air cylinder having two ports serving as air intake ports, an air pump-to be connected to the two ports, two valves respectively interposed between the air pump and the two ports and configured to make the ports communicate with and shut off from the atmosphere, and a control device configured to control the two valves-to make the two ports communicate with the atmosphere when the air pump is stopped. Without a special mechanism, switching between automatic opening and closing and manual opening and closing can be made, and in either automatic or manual opening and closing, the doors of the windshield are smoothly opened and closed.

7 Claims, 17 Drawing Sheets

(58) Field of Classification Search
USPC .......................................................... 177/181
See application file for complete search history.

(56) References Cited

U.S. PATENT DOCUMENTS

| | | | |
|---|---|---|---|
| 6,246,018 B1 | 6/2001 | Schink | |
| 8,912,455 B2 | 12/2014 | Laubstein et al. | |
| 9,115,534 B2 | 8/2015 | Kuhlmann | |
| 11,175,176 B2 * | 11/2021 | Oda | G01G 21/286 |
| 2006/0016134 A1 | 1/2006 | Luchinger et al. | |
| 2009/0194340 A1 | 8/2009 | Mock | |
| 2010/0000802 A1 | 1/2010 | Izumo et al. | |
| 2011/0132669 A1 | 6/2011 | Laubstein et al. | |
| 2015/0107912 A1 | 4/2015 | Lewandowski | |
| 2015/0204716 A1 * | 7/2015 | Lewandowski | G01G 21/286 |
| | | | 177/180 |
| 2016/0250628 A1 | 9/2016 | Graf et al. | |
| 2016/0265964 A1 | 9/2016 | Kuhlmann et al. | |
| 2019/0162587 A1 | 5/2019 | Kanno et al. | |

FOREIGN PATENT DOCUMENTS

| | | | |
|---|---|---|---|
| JP | 5-73541 | | 10/1993 |
| JP | 9-15031 | | 1/1997 |
| JP | 10-244940 A | | 9/1998 |
| JP | 3065617 B2 | | 5/2000 |
| JP | 2003262549 A | | 9/2003 |
| JP | 2006030188 | | 2/2006 |
| JP | 2006030188 A | | 2/2006 |
| JP | 2008-216047 A | | 9/2008 |
| JP | 2017058204 | * | 3/2017 |
| JP | 2017-219501 A | | 12/2017 |
| WO | 2018020579 | | 2/2018 |
| WO | WO-2022137500 A1 | * | 6/2022 |

* cited by examiner

FIG. 9
(A)
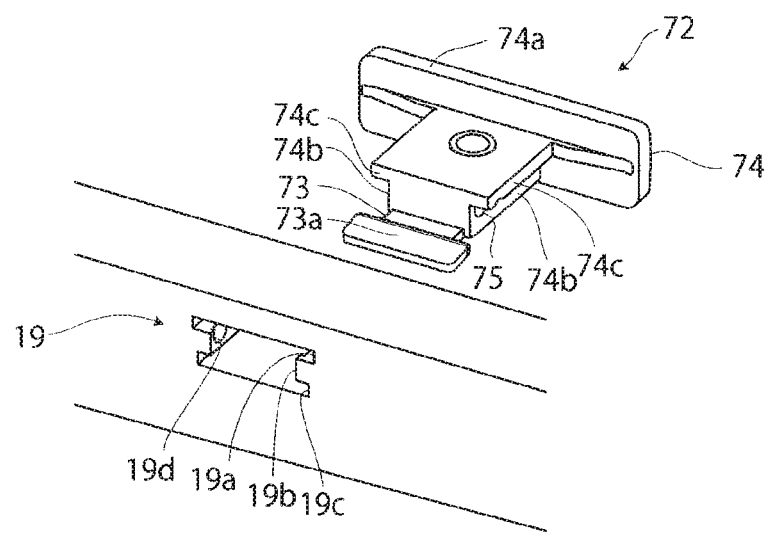
(B)
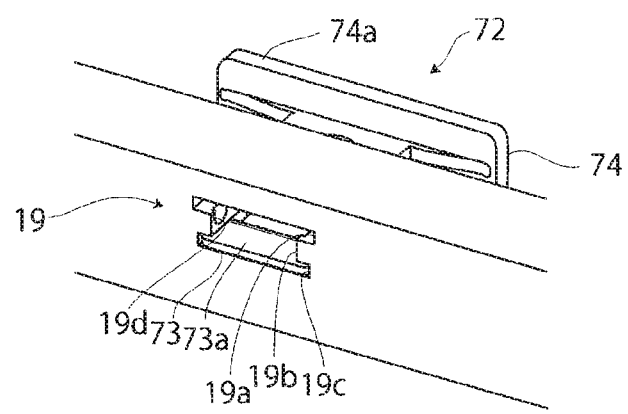
(C)
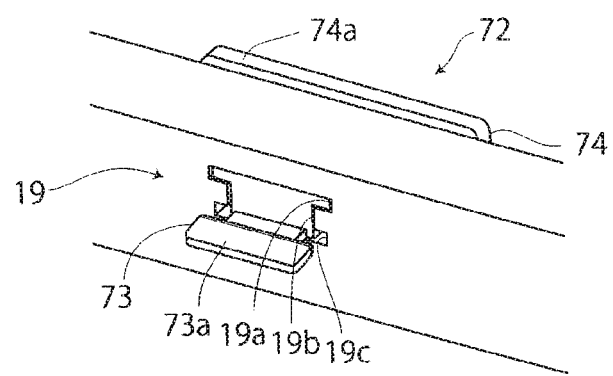

FIG. 10
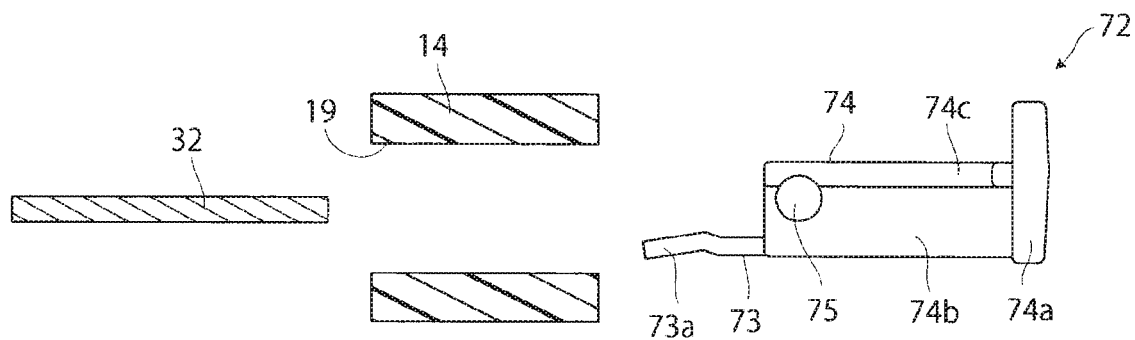
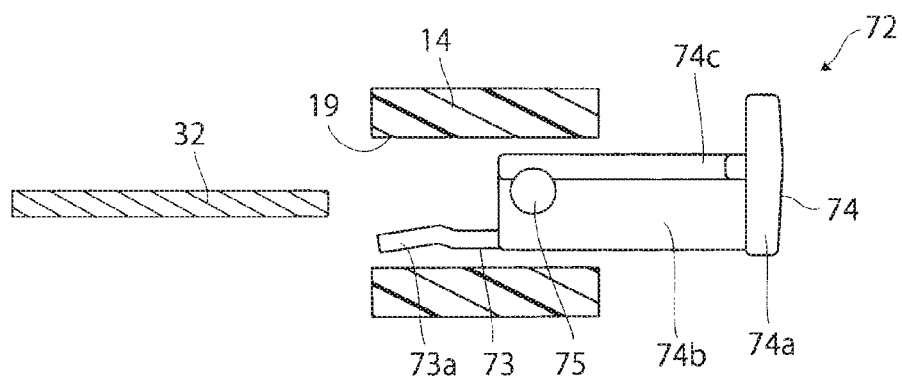
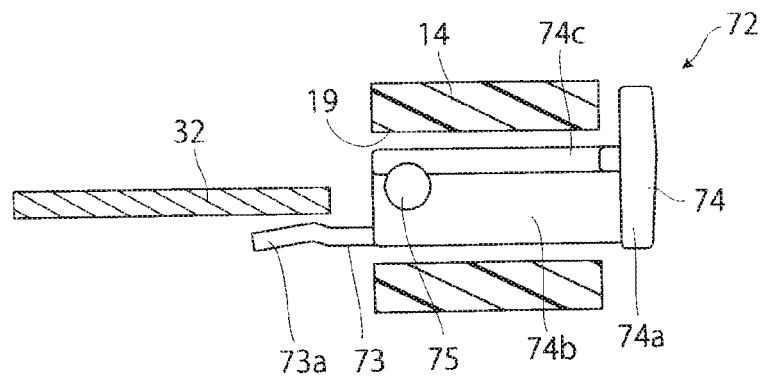

FIG. 15

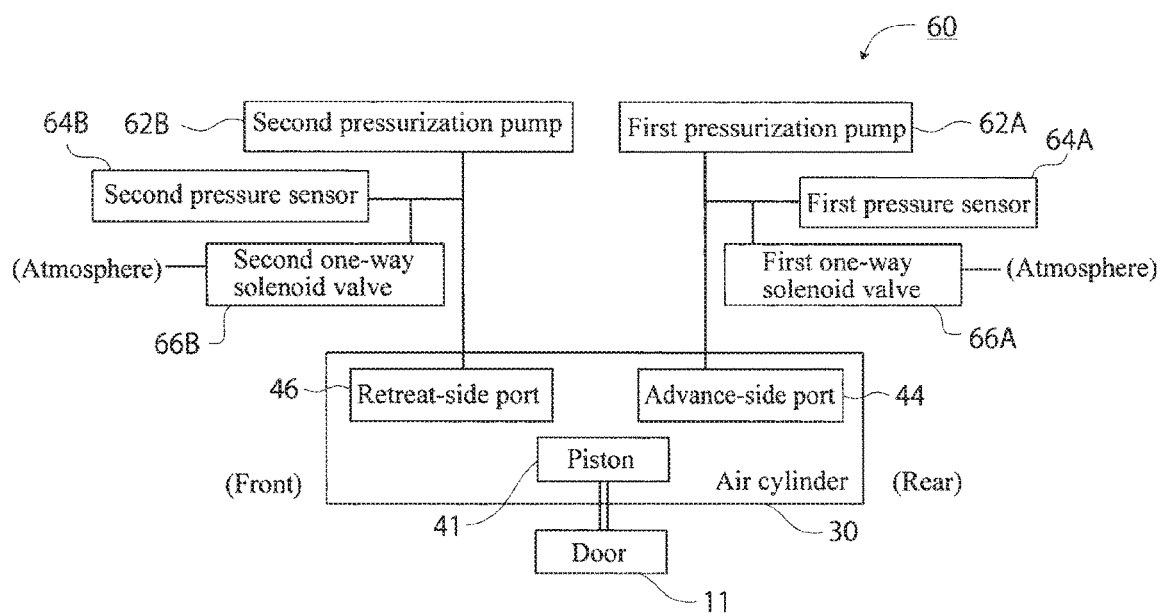

FIG. 16

|  | Door 11 | | Standard state | During calibration |
|---|---|---|---|---|
|  | Automatic opening operation (move rearward) | Automatic closing operation (move forward) | Standard state (manually openable and closable) | During calibration |
| First one-way solenoid valve 66A | Open | Close | Open | Close |
| First pressurization pump 62A | Does not operate | Pressurize | Does not operate | Does not operate |
| Second one-way solenoid valve 66B | Close | Open | Open | Close |
| Second pressurization pump 62B | Pressurize | Does not operate | Does not operate | Does not operate |

FIG. 20

|  | Left door 11A | | Right door 11B | | Built-in weight 82 | | Standard state |
|---|---|---|---|---|---|---|---|
|  | Automatic opening operation (move rearward) | Automatic closing operation (move forward) | Automatic opening operation (move rearward) | Automatic closing operation (move forward) | Load onto balance | Unload from balance | Standard state (manually openable and closable) |
| First one-way solenoid valve 66C | Open | Close | Open | Open | Close | Close | Open |
| First two-way solenoid valve 68C | Close | Open | Close | Close | Close | Close | Close |
| Second one-way solenoid valve 66D | Close | Open | Open | Open | Close | Close | Open |
| Second two-way solenoid valve 68D | Open | Close | Close | Close | Close | Close | Close |
| Third one-way solenoid valve 66E | Open | Open | Open | Close | Close | Close | Open |
| Third two-way solenoid valve 68E | Close | Close | Close | Open | Close | Close | Close |
| Fourth one-way solenoid valve 66F | Open | Open | Close | Open | Close | Close | Open |
| Fourth two-way solenoid valve 68F | Close | Close | Open | Close | Close | Close | Close |
| Fifth one-way solenoid valve 66G | Open | Open | Open | Open | Close | Open | Open |
| Fifth two-way solenoid valve 68G | Close | Close | Close | Close | Open | Close | Close |
| Pressurization pump 62C | Pressurize | Pressurize | Pressurize | Pressurize | Pressurize | Does not operate | Does not operate |

FIG. 22

|  | Left door 11A | | Right door 11B | | Built-in weight 82 | | Standard state |
|---|---|---|---|---|---|---|---|
|  | Automatic opening operation (move rearward) | Automatic closing operation (move forward) | Automatic opening operation (move rearward) | Automatic closing operation (move forward) | Load onto balance | Unload from balance | Standard state (manually openable and closable) |
| First one-way solenoid valve 66H | Close | Close | Open | Open | Close | Close | Open |
| First two-way solenoid valve 68H | Open | Open | Close | Close | Close | Close | Close |
| Second one-way solenoid valve 66I | Open | Open | Close | Close | Close | Close | Open |
| Second two-way solenoid valve 68I | Close | Close | Open | Open | Close | Close | Close |
| Third one-way solenoid valve 66J | Open | Open | Open | Open | Close | Open | Open |
| Third two-way solenoid valve 68J | Close | Close | Close | Close | Open | Close | Close |
| Pressurization/ decompression pump 69 | Decompress | Pressurize | Decompress | Pressurize | Pressurize | Does not operate | Does not operate |

ELECTRONIC BALANCE

TECHNICAL FIELD

The present invention relates to an electronic balance with a windshield having a door that can be smoothly opened and closed either automatically or manually.

BACKGROUND ART

Conventionally, as a mechanism to automatically open and close a door of a windshield, various mechanisms such as a rack-and-pinion and a pulley belt, etc., as described in Patent Literature 1, etc. are proposed.

CITATION LIST

Patent Literature

[Patent Literature 1] Japanese Published Unexamined Utility Model Application No. H05-62825

SUMMARY OF INVENTION

Technical Problem

However, there is a problem in which when the automatic opening and closing door is manually opened or closed, it feels very heavy, or manual opening and closing are impossible. In a configuration in which a door is opened and closed by means of a rack-and-pinion mechanism, since the rack and pinion always mesh with each other, in the case of a manual operation, the door fells very heavy, and in an attempt to forcibly open the door, pinion teeth may be damaged. Similarly, also in a mechanism using a rubber belt such as a pulley belt, the rubber belt and the door are always in contact with each other, so that the door feels heavy when it is manually moved.

The present invention was made in view of the above-described circumstances, and provides a balance with a windshield having a door that can be smoothly opened and closed either automatically or manually.

Solution to Problem

In order to solve the problem described above, an electronic balance of the present invention includes a balance main body including a weighing mechanism connected to a weighing pan, a windshield having a door capable of opening and closing by sliding, and configured to form a weighing chamber by covering the weighing pan, and an actuator configured to open and close the door, wherein the actuator includes a double-acting type air cylinder having two ports serving as air intake ports, an air pump to be connected to the two ports, two valves respectively interposed between the air pump and the two ports and configured to make the ports communicate with and shut off from the atmosphere, and a control device configured to control the two valves to make the two ports communicate with the atmosphere when the air pump is stopped. With this configuration, in the air cylinder serving as a drive source of the door, the ports of the air cylinder are made to communicate with the atmosphere after the door is automatically opened or closed, so that opening and closing are immediately enabled manually as well. Without needing a special switching mechanism, manual opening and closing are also enabled in a state where no load is applied by the drive source, and the door can be smoothly opened and closed either automatically or manually.

In an embodiment, the electronic balance further includes a pressure sensor configured to monitor a pressure of air discharged from the air pump, wherein the control device is configured to perform control so as to stop the air pump and make the two ports communicate with the atmosphere when the pressure sensor detects a rapid increase in air pressure. Opening and closing operations are performed according to monitoring of the air pressure, so that finger pinching can be prevented, and high safety is obtained.

In an embodiment, the electronic balance further includes a pressure sensor configured to monitor a pressure of air discharged from the air pump, wherein the control device is configured to control the two valves, in a case where the pressure sensor does not detect a decrease in air pressure within a predetermined time when the air pump is activated with one of the two ports being made to communicate with the atmosphere and the other one port being made to shut off from the atmosphere, so as to reverse the communication with the atmosphere and communication shut-off from the atmosphere of the two ports. With this configuration, operations in cases of an erroneous operation and half-opening are secured.

In an embodiment, a power chamber partitioned and separated from the weighing chamber is formed in the windshield, and the air pump and the two valves are disposed inside the power chamber. Vibration of the power chamber is prevented from being transmitted to the weighing chamber, and this contributes to reduction of weighing errors.

In an embodiment, the door is hung and supported from an upper portion, and the air cylinder is disposed above the door and connected to a door hanging portion of the door. The hung and supported door is directly slid by the air cylinder, so that force transmissibility from the drive source is high, and the door can be smoothly opened and closed.

In an embodiment, the control device is configured to control the valves so that communication of the two ports with the atmosphere is shut off during calibration of the balance main body. During calibration, the door is locked so as not to move, and the door is prevented from being opened by mistake and harmfully influencing the calibration.

In an embodiment, the control device is configured to control the valves so that communication and shutting-off between the two ports and the atmosphere are switched according to a command input. Without providing a special switching mechanism, switching between automatic opening and closing and manual opening and closing of the door can be made only by control of the valves, and this switching can be made only by a command input, and this is very convenient for use.

Effect of Invention

With the configuration described above, a balance with a windshield can be provided including a door that is capable of being smoothly opened and closed either automatically or manually.

BRIEF DESCRIPTION OF THE DRAWINGS

FIG. 9 are views illustrating an engaged state of the engagement member and an engagement hole.

FIG. 10 are conceptual diagrams illustrating an engaged state of a floor member and the engagement member.

FIG. 15 is a block diagram of a door opening and closing mechanism according to the first embodiment.

FIG. 16 is an operation chart of the door opening and closing mechanism according to the first embodiment.

FIG. 20 is an operation chart of the door opening and closing mechanism according to the second embodiment.

FIG. 22 is an operation chart of the door opening and closing mechanism according to the third embodiment.

DESCRIPTION OF EMBODIMENTS

Configuration of Electronic Balance with Windshield

Figure 1:
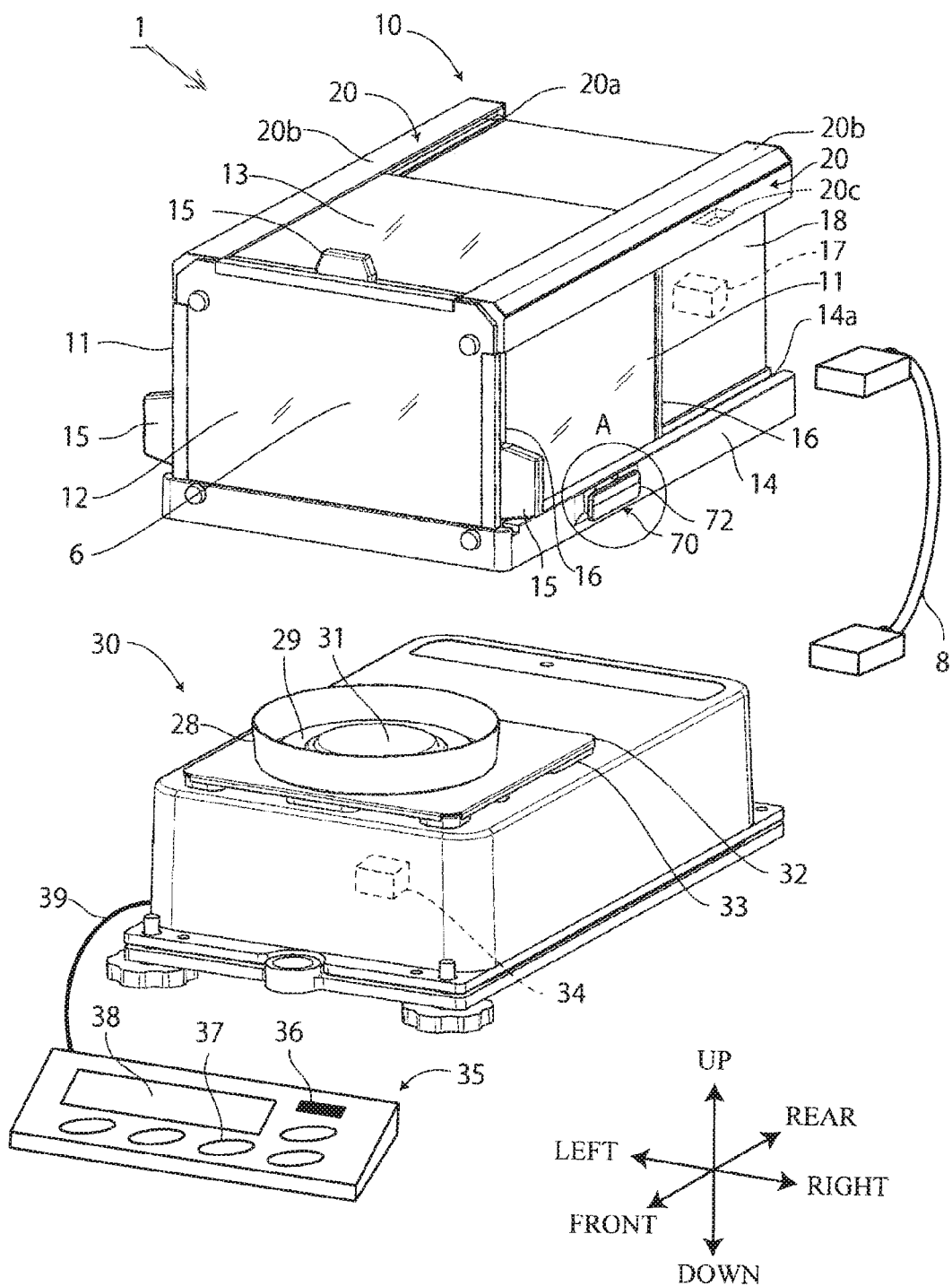
FIG. 1 is a perspective view of an electronic balance with a windshield according to a first embodiment.

Hereinafter, preferred embodiments relating to a configuration of the present disclosure are described with reference to the drawings. FIG. 1 is a perspective view of an electronic balance 1 with a windshield according to a first embodiment.

As illustrated in FIG. 1, the electronic balance 1 with a windshield includes a balance main body 30, a windshield 10 to be attached to the balance main body 30, a connector 8 that connects the balance main body 30 and the windshield 10, and a control panel 35.

The balance main body 30 includes, on an upper surface thereof, a weighing pan 31 on which a specimen is placed. A control unit 34 that controls a weighing mechanism connected to the weighing pan 31 and the windshield 10 is disposed inside the balance main body 30. Onto the upper surface of the balance main body 30, a floor member 32 is fixed, a dust plate 29 is placed on an upper surface of the floor member 32, and further, a ring-shaped windshield ring 28 is placed on the dust plate 29. The dust plate 29 prevents a specimen spilling out of the weighing pan 31 from falling on the balance main body 30, and the windshield ring 28 plays a role in preventing wind effects on the weighing pan 31.

The windshield 10 is disposed on the upper surface of the balance main body 30 so as to enclose a periphery of the weighing pan 31, and prevents air flow during weighing, for example, wind from an air conditioner, breath of a person at the time of weighing, and an air flow generated when a person walks, etc., from acting as a wind pressure on a load-applied portion centered on the weighing pan 31 and influencing weighing.

The windshield 10 has a bottomless box shape, and has a front glass 12 at a front surface, a box-shaped case 18 at a back portion, doors 11 at portions of left and right side walls, and an upper surface door 13 at the upper surface, and as a space defined by these, a weighing chamber 6 having a rectangular parallelepiped shape is formed inside.

The doors 11 can respectively move forward and rearward along rails 14a provided on a frame 14 as a frame member at a lower portion of the windshield 10, and the door 11 can move forward and rearward along rails 20a provided in cylinder boxes 20 as frame members at an upper portion of the windshield 10. The front glass 12 is fixed to the front sides of the frame 14 and the cylinder boxes 20 by fixing members such as bolts.

The front glass 12, the upper surface door 13, and the left and right doors 11 are made of transparent glass or resin so that an internal state can be observed. To each of the upper surface door 13 and the doors 11, a handle 15 that assists sliding is attached.

The cylinder boxes 20 are provided to form the left and right upper sides of the windshield 10 having a substantially rectangular parallelepiped shape. In the cylinder box 20, an air cylinder 40 that is a means for opening and closing the door 11 is housed. Inside the case 18, a power chamber 17 is formed.

The control panel 35 is for operating the balance main body 30 and the windshield 10, and is provided separately from the balance main body 30. This is to prevent vibration caused by an operation such as pushing on a switch from influencing weighing. The control panel is separated from the balance main body, so that a user can freely arrange the control panel at a position easy to operate. The control panel 35 is connected to the balance main body 30 by a cable 39. The control panel 35 and the balance main body 30 may be connected by wireless communication.

The control panel 35 includes, on an upper surface thereof, a display unit 38 to display weighing results and states, switches 37 for operation, and an infrared sensor 36. The infrared sensor 36 is an opening and closing switch of the doors 11, and only by holding a hand over the infrared sensor, can the doors 11 be automatically opened and closed. A press switch may be provided in place of the infrared sensor 36, and a configuration in which both of a press switch and the infrared sensor 36 are provided is also preferable. To the infrared sensor 36, a balance operating function other than the door 11 opening and closing function may be assigned. It is also possible that two left and right infrared sensors 36 are provided and configured to respectively open and close corresponding doors 11.

The windshield 10 and the balance main body 30 are connected by the connector 8. The windshield 10 receives electric power and command signals from the balance main body 30 through the connector 8.

Attaching and Detaching Mechanism

In the frame 14, a pair of left and right attaching and detaching mechanisms 70 are provided. The attaching and detaching mechanisms 70 are described in detail. In the frame 14, an engagement hole 19 is formed that penetrates through the frame to the inside, and in the engagement hole 19, an engagement member 72 is inserted. The engagement member 72 is inserted through the engagement hole 19 and engaged with or disengaged from the floor member 32 fixed to a bottom surface of the balance main body 30, and accordingly, the windshield 10 is attached to or detached from the balance main body 30.

Figure 2:
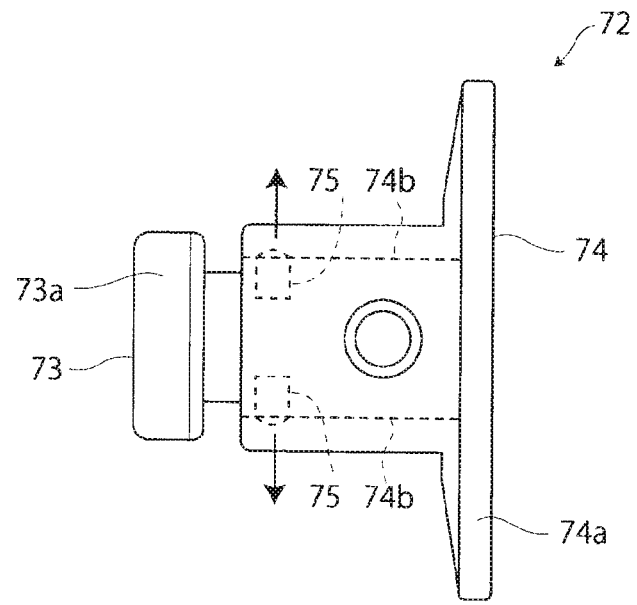
FIG. 2 is a plan view of an engagement member.
Figure 3:
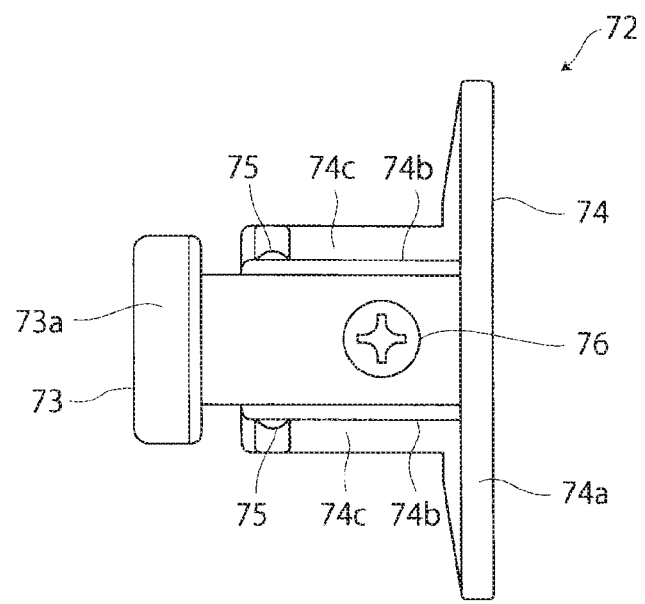
FIG. 3 is a bottom view of the engagement member.
Figure 4:
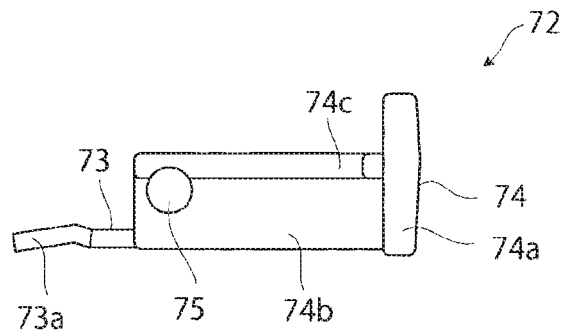
FIG. 4 is a right side view of the engagement member.
Figure 5:
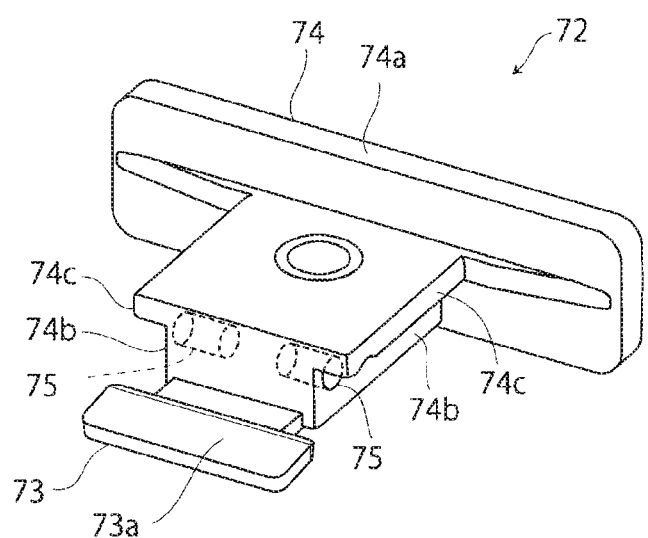
FIG. 5 is a perspective view of the engagement member.
Figure 6:
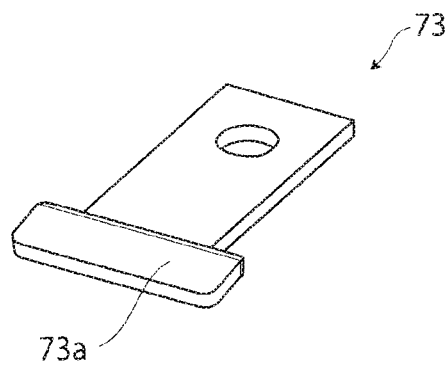
FIG. 6 is a perspective view of a flat plate.

The engagement member 72 includes a flat plate 73 and a housing 74. FIG. 2 is a plan view of the engagement member 72, FIG. 3 is a bottom view of the engagement member 72, FIG. 4 is a right side view of the engagement member 72, FIG. 5 is a perspective view of the engagement member 72, and FIG. 6 is a perspective view of the flat plate 73.

The flat plate 73 is attached to the housing 74, and directly engages with the floor member 32 fixed to the balance main body 30. The flat plate 73 is made of a material with high strength such as a metal plate. The flat plate 73 is fixed to the housing 74 by a fixation means such as a machine screw 76 in a state where a contact portion 73a, which is the tip end portion, protrudes. The contact portion 73a is a portion that comes into contact with the floor member 32 of the balance main body 30, and is formed to be wider than other portions to increase the contact area.

In the housing 74, an end portion at the side opposite the end portion at the side from which the contact portion 73a protrudes is a grip portion 74a to be gripped at the time of an operation of inserting and pulling out the engagement member 72.

At upper portions of side wall portions 74b of the housing 74, eaves portions 74c overhanging to the outer sides of the side wall portions 74b are formed.

Holes are formed so as to become orthogonal to the side wall portions 74b of the housing 74, and inside the holes, a pair of left and right lock pins 75 are disposed. Both of the lock pins 75 are energized so as to protrude to the outer sides of the side wall portions 74b (the arrow directions in FIG. 2) by an elastic body such as a coil spring (not illustrated) interposed between the lock pins 75.

Figure 7:
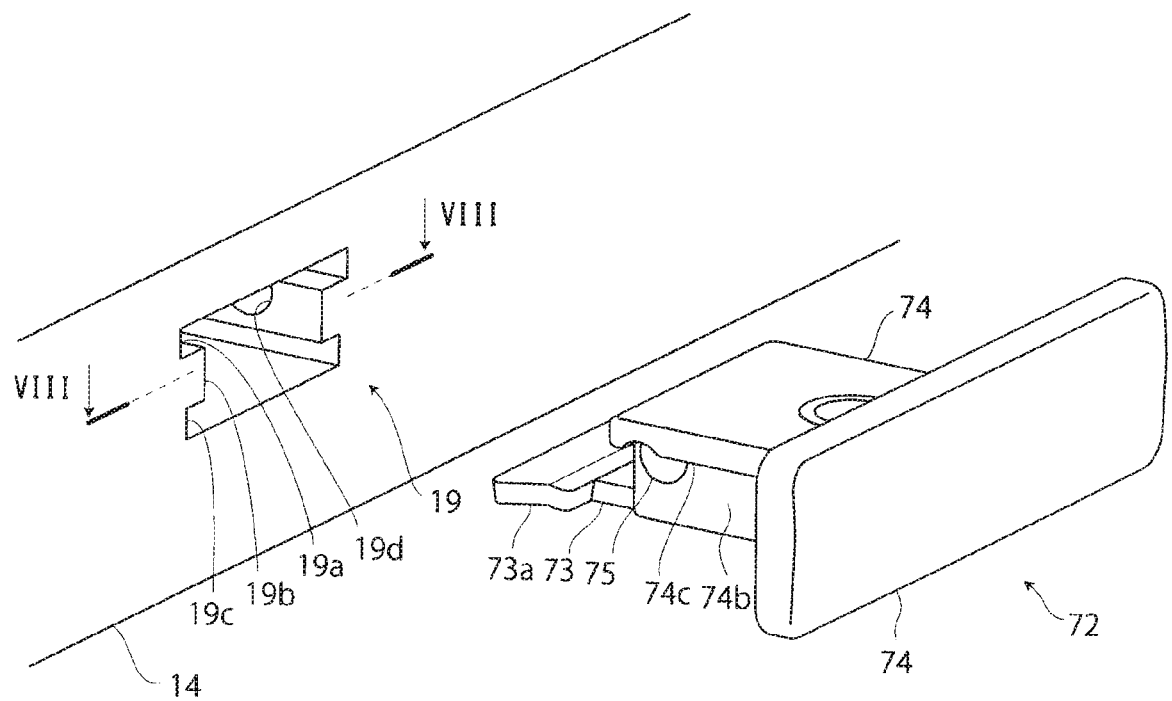
FIG. 7 is an enlarged view of portion A in FIG. 1 in a state where the engagement member is pulled out.
Figure 8:
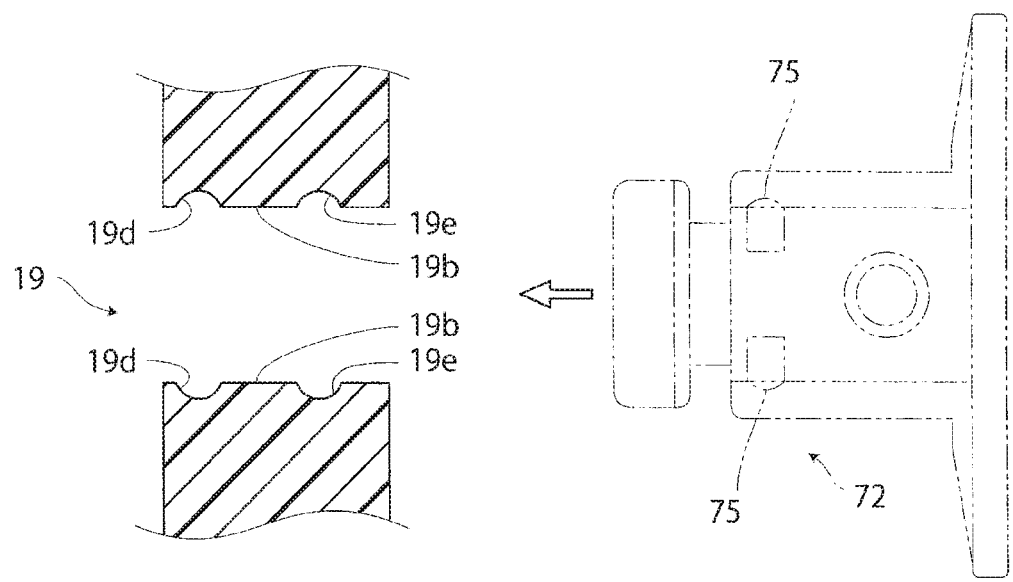
FIG. 8 is a sectional view taken along line VIII-VIII in FIG. 7.

Next, the engagement holes 19 provided in the frame 14 are described. FIG. 7 is an enlarged view of portion A in FIG. 1, and illustrates a state where the engagement member 72 is pulled out from the engagement hole 19. FIG. 8 is a sectional view taken along line VIII-VIII in FIG. 7.

At two positions opposed to each other on the left and right wall portions of the frame 14, the engagement holes 19 are formed. The engagement holes 19 are orthogonal to the side walls of the frame 14, and are formed to penetrate through the frame 14. The engagement holes 19 are guide holes to guide advancing/retreating movements of the engagement members 72.

A front surface shape of the engagement hole 19 is a substantially I shape consisting of an upper horizontal portion 19a, a lower horizontal portion 19c, and a vertical portion 19b connecting both horizontal portions. The engagement hole 19 is configured so that the eaves portions 74c of the housing 74 are fitted into the upper horizontal portion 19a, the side wall portions 74b of the housing 74 are positioned at the vertical portion 19b, and the flat plate 73 is inserted through the lower horizontal portion 19c. Accordingly, the engagement member 72 is smoothly inserted and pulled out along the engagement hole 19 without slipping out of the engagement hole 19.

In the vertical portion 19b of the engagement hole 19, locking recess portions (19d and 19e) are formed at two positions in the depth direction. The locking recess portions (19d and 19e) are formed at a deepness at which they engage with the lock pin 75, and when the engagement member 72 is inserted in and pulled out from the engagement hole 19, the lock pins 75 of the engagement member 72 engage with either the locking recess portion 19d or 19e. Accordingly, the engagement member 72 is stopped and fixed at a predetermined position in the engagement hole 19.

Subsequently, the floor member 32 of the balance main body 30 with which the windshield 10 directly engages is described with reference to FIG. 1. The floor member 32 itself is a component conventionally attached to the balance main body 30.

In the upper surface of the balance main body 30, a through hole (not illustrated) is provided. This through hole communicates with the inside of the balance main body 30, and makes the air pressure inside the balance main body 30 and the air pressure around the balance main body 30 equal to each other, and prevents weighing errors caused by an air pressure change. To prevent dust from entering from the through hole while making the through hole and the atmosphere communicate with each other, the floor member 32 is attached to the upper surface of the balance main body 30 in a state where the floor member is separated from the balance main body 30 by a spacer 33.

The floor member 32 is disposed to be centered at the weighing pan 31, and is fixed to the upper surface of the balance main body 30 by machine screws or the like. The floor member 32 is normally made of stainless steel, or a chromed steel material, etc. A casing constituting the balance main body 30 is formed of an aluminum die-casting or synthetic resin molding product, but if the weighing pan 31 is directly disposed on this casing, it becomes difficult to remove a specimen that fell onto the casing surface. Further, in the case where the casing is made of synthetic resin, depending on the kind of specimen, a situation in which the casing itself is dissolved by the specimen is assumed to occur. By disposing the floor member 32, even if a specimen such as a liquid or powder falls, the floor member 32 is highly resistant to the specimen, and the surface of the floor member is machined to be flat and smooth by mirror-like finishing, so that the specimen can be easily wiped off. In addition, the material forming the floor member is a metal plate, so that its original physical strength is also extremely high. In the present embodiment, by locking the engagement members 72 to this floor member 32, the windshield 10 is fixed to the balance main body 30.

FIG. 9 are views each illustrating a fitting-through state of the engagement member 72 and the engagement hole 19, and illustrate perspective views of the frame 14 from the inside of the windshield 10. FIGS. 10 are conceptual diagrams illustrating an engagement state between the floor member 32 and the engagement member 72.

FIGS. 9(A) and 10(A) illustrate a state where the engagement member 72 is disengaged from the engagement hole 19.

FIGS. 9(B) and 10(B) illustrate a state where the engagement member 72 is inserted in the engagement hole 19, and the lock pins 75 are positioned at the locking recess portions 19e recessed in the engagement hole 19. The lock pins 75 are energized so as to protrude outside by the coil spring not illustrated, and engage with the locking recess portions 19d (or 19e) and fix the engagement member 72 at the position of the locking recess portions. In this state, the contact portion 73a of the flat plate 73 is not in engagement with the floor member 32, and the windshield 10 is detachable from the balance main body 30.

FIGS. 9(C) and 10(C) illustrate a state where the engagement member 72 is further inserted in the engagement hole 19, and the lock pins 75 are positioned at the locking recess portions 19*d*. The lock pins 75 engage with the locking recess portions 19*d* and fix the engagement member 72 in a state where the tip end of the flat plate 73 protrudes to the inside of the windshield 10. Accordingly, the contact portion 73*a* of the flat plate 73 closely engages with a back surface of the floor member 32, and by this engagement, the windshield 10 is firmly fixed to the balance main body 30.

Operation and Effect of Attachment and Detachment

In the present embodiment, the windshield 10 has a door 11 automatic opening and closing function, however, a drive source and a drive mechanism for automatic opening and closing are all housed inside the windshield 10 in a form that does not influence weighing (described in detail later). The attaching and detaching mechanism 70 fixes the windshield 10 by using the floor member 32 conventionally provided, so that without making any modification to the balance main body 30 side, the windshield 10 can be fixed. Conventionally, a windshield with a door opening and closing function has a problem in which the degree of freedom of design is low because the balance and the windshield are configured and designed as an integrated body. In the present embodiment, the balance and the windshield are configured as separate bodies independent from each other, and the balance main body 30 and the windshield 10 can be designed separately, so that the degree of freedom of design is high. The balance main body 30 can be freely designed without restrictions in design caused by the windshield 10 and the addition of the door automatic opening and closing function.

A balance with a windshield having an automatic opening and closing function is expensive, however, when either the windshield or the balance main body malfunctioned, both of these became unusable, and this was uneconomical. In the present embodiment, a malfunctioning one can be immediately replaced with a new one, and this is economical. Also during repair, the other that is not malfunctioning can be continuously used.

Further, the windshield 10 is fixed by using the floor member 32 conventionally provided, so that if the conditions such as dimensions are met, the windshield 10 having the door automatic opening and closing function can be fitted to an existing electronic balance, and in addition, the windshield 10 can be firmly fixed and used, and this is highly convenient. Although the windshield 10 is freely attachable and detachable, the windshield 10 and the balance main body 30 can be firmly held and integrated, and are easy to carry around, and no troublesome assembling operations are required.

When the electronic balance 1 with a windshield is disposed inside a glovebox the opening of which is narrow, the electronic balance 1 with a windshield can be disassembled into the balance main body 30 and the windshield 10, and these can be put into the glovebox separately, and further, they can be easily assembled inside the glovebox.

Door Structure

Figure 11:
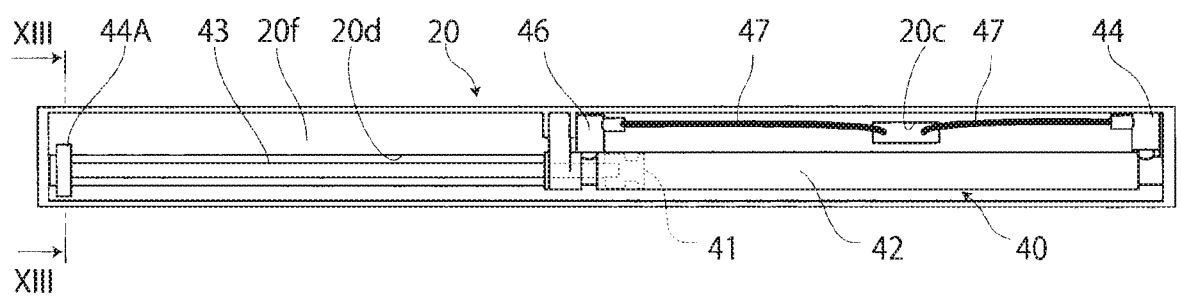
FIG. 11 is a top view of a cylinder box in a state where a cover is removed.
Figure 12:
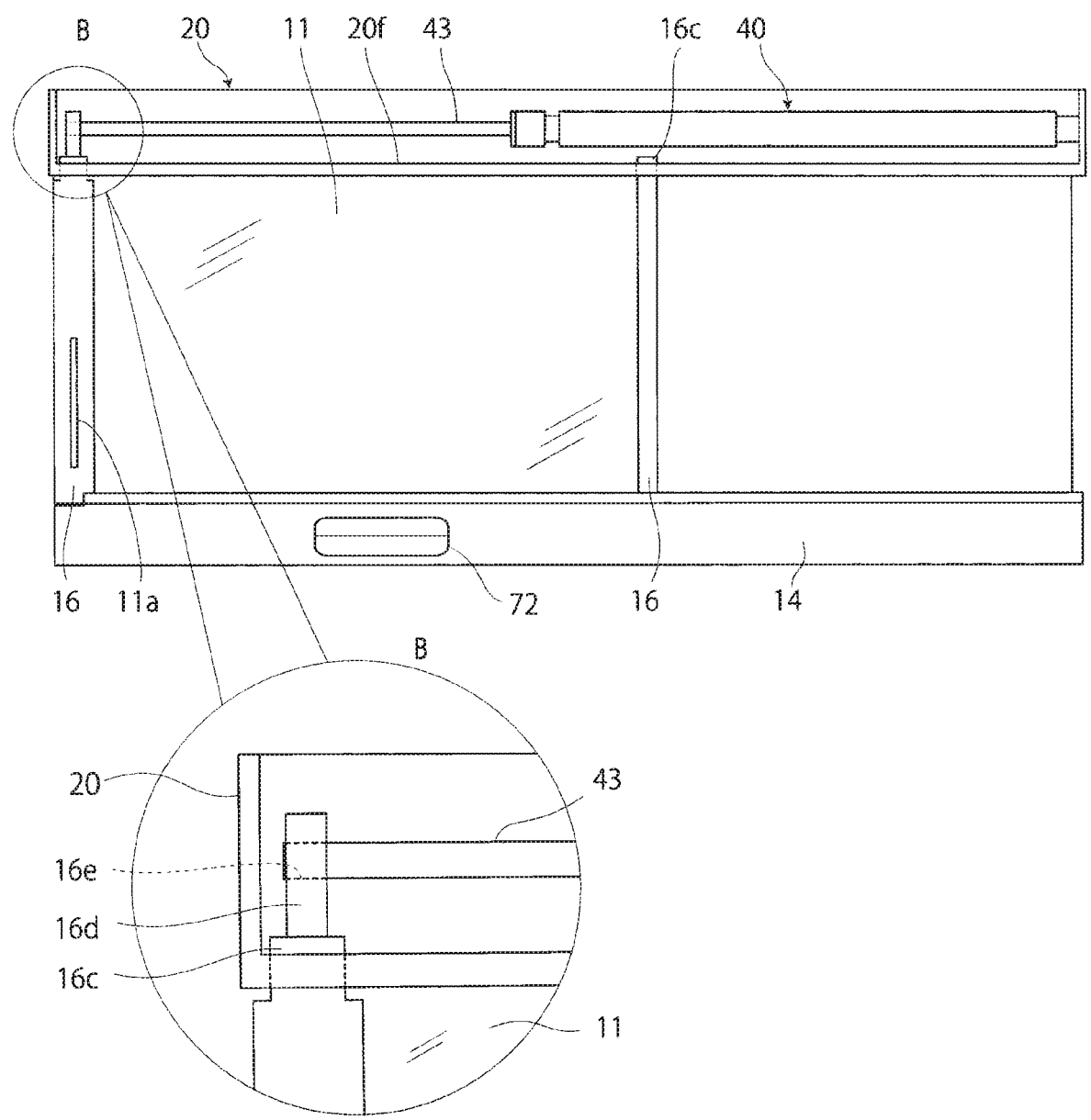
FIG. 12 is a right side view of the windshield in the state where the cover is removed.
Figure 13:
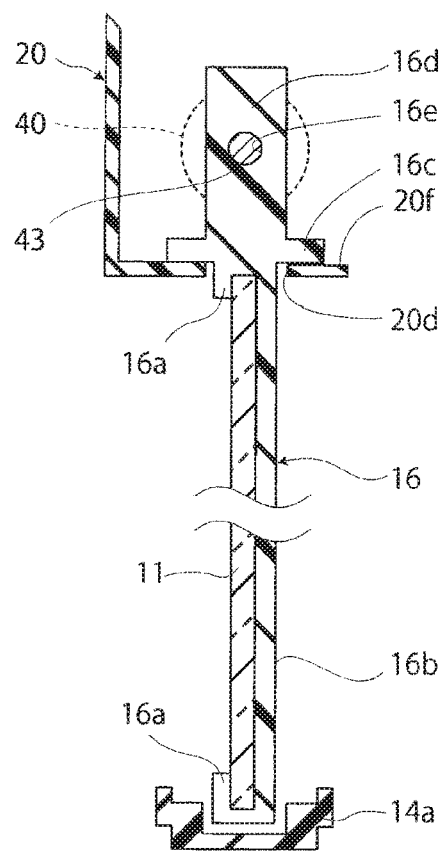
FIG. 13 is a sectional view taken along line XIII-XIII in FIG. 11.
Figure 14:
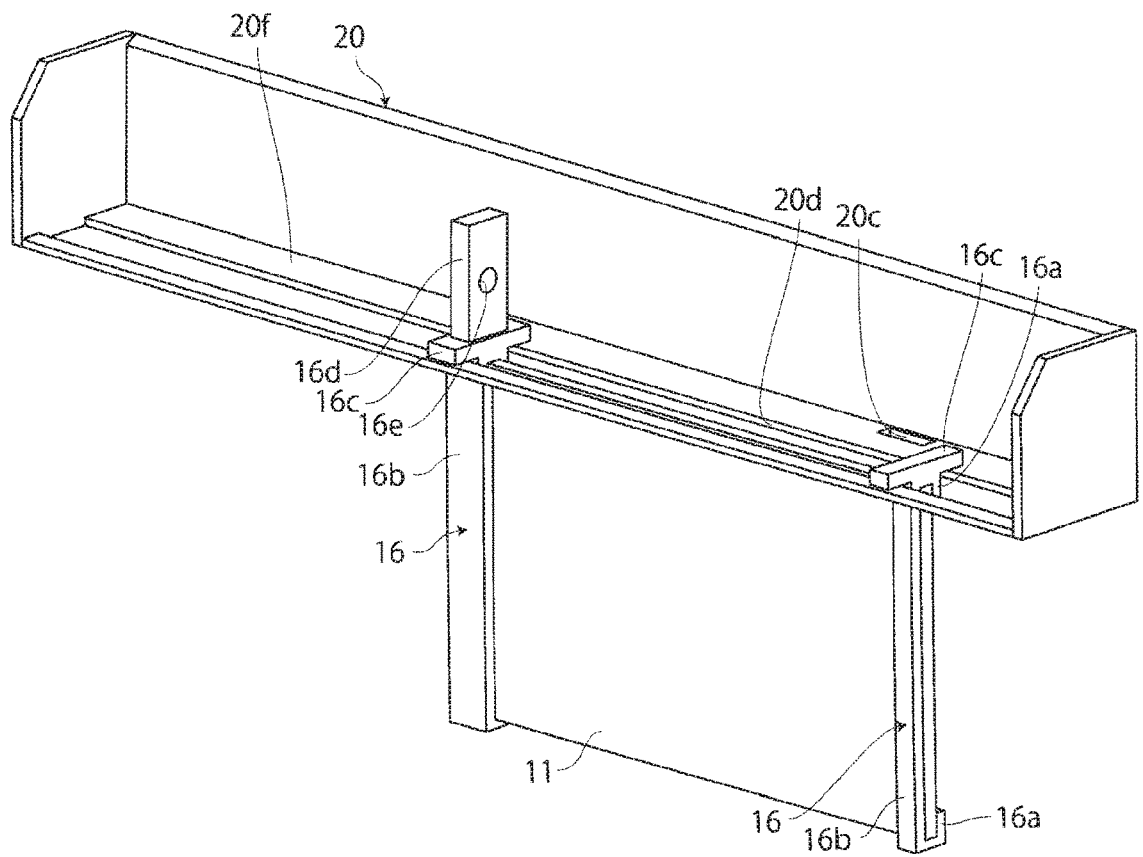
FIG. 14 is an explanatory view to describe a structure of a door 11.

The cylinder box 20 has a cover 20*b* covering the upper surface and the side surfaces of the cylinder box. FIG. 11 is a plan view of the cylinder box 20 in a state where the cover 20*b* is removed, and is an explanatory view to describe the inside of the cylinder box 20. FIG. 12 is a right side view of the windshield 10 in the state where the cover 20*b* is removed. FIG. 13 is a sectional view taken along line XIII-XIII in FIG. 11, and is an explanatory view to illustrate the shape and operation of a holder 16. FIG. 14 is a perspective view of the cylinder box 20 and the door 11, and is an explanatory view to describe the structures of these.

Inside the cylinder box 20, the air cylinder 40 is fixed. The air cylinder 40 is a double-acting type, and both of the forward and backward strokes of reciprocating motion of a piston 41 inside the air cylinder 40 are made by air pressure. Therefore, ports to feed air to the inside of the air cylinder 40 are provided at two positions. At the front side of the cylinder tube 42 having the piston 41 inside, a retreat-side port 46 for making the piston 41 move rearward by fed air is provided. In the same manner, at the rear side of the cylinder tube 42, an advance-side port 44 for sending the piston 41 forward is provided.

Air tubes 47 connected to the respective ports pass through a hole 20*c* provided in a bottom surface 20*f* of the cylinder box 20 and connect to the power chamber 17 inside the case 18. In the power chamber 17, pumps serving as drive sources of the air cylinder 40 and solenoid valves to control the flow and stoppage of air are housed.

The power chamber 17 is formed by being separated from the weighing chamber 6 so as not to influence weighing with vibration, etc. Air intake and exhaust ports (not illustrated) formed in the power chamber 17 are directed in a direction opposite to the weighing chamber 6 so that air intake and exhaust do not influence weighing.

Conventionally, when for example, a rack-and-pinion or a rubber pulley is selected as a drive mechanism, a motor serving as a drive source is disposed close to the door from the viewpoint of transmission efficiency. However, in this case, vibration of the motor serving as a drive source is transmitted to the weighing chamber, so that there is concern that the vibration influences weighing. By selecting an air cylinder as a drive mechanism, it becomes unnecessary to dispose the air pump as a power source close to the door, and the air pump can be disposed at a free place. By providing the power chamber 17 in which the air pump is housed by separating to be away from the weighing chamber 6, influences of vibration of the power source on weighing can be reduced.

The cylinder box 20 is formed to be hollow, and inside this, the air cylinder 40 is disposed parallel to the door 11 and fixed while being separated from the bottom surface 20*f* of the cylinder box 20. The air cylinder 40 is disposed inside the cylinder box 20, and this prevents dust entrance and transmission of air vibration from the air cylinder 40 to the weighing chamber 6.

At front and rear end portions of the door 11, holders 16 are disposed. The door 11 is vertically sandwiched by two U-shaped clamp portions 16*a* formed at upper and lower portions of the holder 16, and held by being wrapped by the holder 16 consisting of a combination of the clamping portions 16*a* and a side surface portion 16*b* connecting the upper and lower clamping portions 16*a*. If the door 11 is simply clamped and hung down from above, there is a risk that the door 11 may fall off, however, since the door 11 is firmly held by the holder 16 by being wrapped by the holder 16, there is no risk of falling off.

In the bottom surface of the cylinder box 20, a guide hole 20*d* is formed in a front-rear direction that is a sliding direction of the door 11. At a portion higher than the upper clamping portion 16*a*, a flange portion 16*c* is formed orthogonally to the door 11 (guide hole 20*d*). The flange portion 16*c* protruding leftward and rightward engages in this guide hole 20*d* and supports the door 11 in a hanging manner. Accordingly, the door 11 is disposed in a non-contact manner t with the rail 14*a* formed on the frame 14, and held slidably along the guide hole 20d. When dust and sand, etc., enter the rail 14a, a problem occurs in which the sliding resistance when the door 11 opens or closes increases and it becomes difficult to open and close the door, however, this problem is prevented by hanging the door 11 itself from the upper portion.

In the holder 16 disposed at the front end of the door 11, a coupling portion 16d is formed on an upper surface of the flange portion 16c. At the center of the coupling portion 16d, a coupling hole 16e is formed along the door opening and closing direction, and the tip end of a piston rod 43 extending from the piston 41 of the air cylinder 40 is fitted in this coupling hole 16e and fixed. By the piston 41 (piston rod 43) connected to the door 11 through the holder 16 and by the piston 41 moving forward and rearward by air, the holder 16 slides along the guide hole 20d and the door 11 opens and closes. The air cylinder 40 is fixed while being separated from the bottom surface inside the cylinder box 20, so that the air cylinder does not obstruct movements of the door 11.

Operation and Effect of Door Structure

The air cylinder 40 serving as a drive source of the door 11 is disposed substantially right above the door 11 and parallel to the sliding direction of the door 11. The holders 16 that support the door in a hanging manner support the door 11 by lower portions, and are connected at upper portions to the air cylinder 40, and the air cylinder 40 opens and closes the door 11 by directly sliding the holders 16 that supports the door 11 in a hanging manner The holder 16 on which the door is hung, specifically, the flange portion 16c that serves as a sliding portion when opening and closing the door 11 is disposed close to the air cylinder 40 serving as a drive mechanism. Further, only front and rear end portions of the door 11 are hung with the holders 16, and a sliding area when the door 11 opens and closes is small, and sliding resistance when the door 11 opens and closes is also small. In the present embodiment, the holders 16 and the cylinder boxes 20, and in addition, the doors 11 are also made of resin, so that they are light in weight and have small sliding resistance. With this configuration, force transmissibility from the air cylinder is high, the door 11 can be opened and closed with small force, and the door 11 can be smoothly opened and closed.

When the door of the windshield is opened and closed by using a conventional opening and closing mechanism, for example, a rubber pulley, in order to transmit power of the motor to the door having a certain degree of weight, the pulley at the door portion must be made large or the power of the motor must be made high. The balance is easily influenced by wind, and wind is easily produced by high-speed opening and closing of the door, so that in order also to decrease the opening and closing speed, the pulley must be made large for decreasing the speed. If the door is formed to be thin and light in weight, it is difficult to transmit power to the door and the motor is inevitably made large. Further, the motor needs to be disposed near (substantially, at the upper portion of) the door, and this disposition of a large-sized motor is awkward, and makes the appearance unsightly. By disposing the air cylinder 40 long in one direction along the door 11 at the upper portion of the door 11, the windshield 10 can be formed into a substantially rectangular parallelepiped shape, and the appearance and configuration become simple.

Block Diagram

FIG. 15 is a block diagram illustrating an opening and closing mechanism 60 of the left or right door 11 of the electronic balance 1 with a windshield. The opening and closing mechanism 60 is a mechanism to open and close the left or right door 11, and another set of the components illustrated in FIG. 15 is present, and the components are the same, so that they are omitted in illustration. In the present embodiment, a pump to move forward (advance) the piston 41 of the air cylinder 40 and a pump to move rearward (retreat) the piston 41 are present separately.

Both of a first pressurization pump 62A and a second pressurization pump 62B are air pumps. These pumps are drive sources of the air cylinder 40, and compress air and feed the compressed air to the air cylinder 40, and move the piston 41 by air pressures to open and close the door 11.

Outlet sides of a first one-way solenoid valve 66A and a second one-way solenoid valve 66B are opened to the atmosphere, and by opening and closing the valves, the flow and stoppage of air are controlled.

A first pressure sensor 64A monitors a pressure of air discharged from the first pressurization pump 62A, and a second pressure sensor 64B monitors a pressure of air discharged from the second pressurization pump 62B.

To the advance-side port 44 provided at the rear side of the air cylinder 40, the first pressurization pump 62A is connected. This connection has a branch halfway, and the first pressure sensor 64A and the first one-way solenoid valve 66A are further connected. To the retreat-side port 46 provided at the front side of the air cylinder 40, the second pressurization pump 62B is connected. This connection has a branch halfway, and the second pressure sensor 64B and the second one-way solenoid valve 66B are connected to this branch. These components are connected by the air tubes 47, respectively.

Operations of the respective components of the opening and closing mechanism 60 are controlled by the control unit 34 of the balance main body 30. For this reason, an instruction for the opening and closing mechanism 60 is performed through the balance main body 30, however, a configuration is also preferable in which a windshield control unit to control the windshield 10 is provided inside the windshield 10, and a command input is directly transmitted from the control panel 35 to the windshield control unit. In this case, a configuration is also preferable that a command input unit is provided in the windshield 10 itself so that the windshield 10 can be operated alone.

Operation When Opening and Closing Door

Next, operations of the respective components when the door 11 is automatically opened and closed are described. FIG. 16 is an operation chart of the opening and closing mechanism 60.

First, in a "standard state" in which a user can manually open and close the door 11, neither of the first pressurization pump 62A and the second pressurization pump 62B is activated, and the first one-way solenoid valve 66A and the second one-way solenoid valve 66B are open. Because neither of the pressurization pumps (62A and 62B) operates, and both of the one-way solenoid valves (66A and 66B) are opened and communicate with the atmosphere, so that no load is applied from the air cylinder 40, and the door 11 can be smoothly manually opened and closed.

When a command to "open/close door" is input from the infrared sensor 36 of the control panel 35, the control unit 34 commands the respective components to operate.

In a case of an "automatic opening operation" to open the door 11, that is, in a case where the piston 41 of the air cylinder 40 is moved rearward, the second one-way solenoid valve 66B is closed, and pressurization of the second pressurization pump 62B is started. At this time, the first pressurization pump 62A is not activated, and the first one-way solenoid valve 66A is open, so that the piston 41 is moved rearward by an air pressure, and the door 11 is opened.

When the door 11 fully opens, the air pressure rapidly increases, so that when this change is detected by the second pressure sensor 64B, the second pressurization pump 62B is stopped, the second one-way solenoid valve 66B is opened, and the compressed air inside the air cylinder is released to the atmosphere, and the mechanism returns to the standard state.

In a case of an "automatic closing operation" to close the door 11, that is, in a case where the piston 41 of the air cylinder 40 is moved forward, the first one-way solenoid valve 66A is closed, and pressurization of the first pressurization pump 62A is started. At this time, the second pressurization pump 62B does not operate, and the second one-way solenoid valve 66B is open, so that the piston 41 is moved forward by an air pressure, and the door 11 is closed.

When the door 11 fully closes, the air pressure rapidly increases again, so that when this change is detected by the first pressure sensor 64A, the first pressurization pump 62A is stopped, the first one-way solenoid valve 66A is opened, and the compressed air inside the air cylinder is released to the atmosphere, and the mechanism returns to the standard state.

On the other hand, when calibration is performed, the first one-way solenoid valve 66A and the second one-way solenoid valve 66B are closed. Both of the one-way solenoid valves (66A and 66B) are closed, the piston 41 can move neither forward nor rearward, and the door 11 is locked. This is to prevent the door from being unexpectedly opened during calibration operation and influencing calibration. After the calibration is finished, the first one-way solenoid valve 66A and the second one-way solenoid valve 66B are opened, and the mechanism returns to the standard state.

In this way, the door 11 is automatically locked during calibration operation. The door 11 may be configured to be locked according to a command from the switch 37. Not only during calibration, the door 11 can also be locked during transportation.

Flowchart

Figure 17:
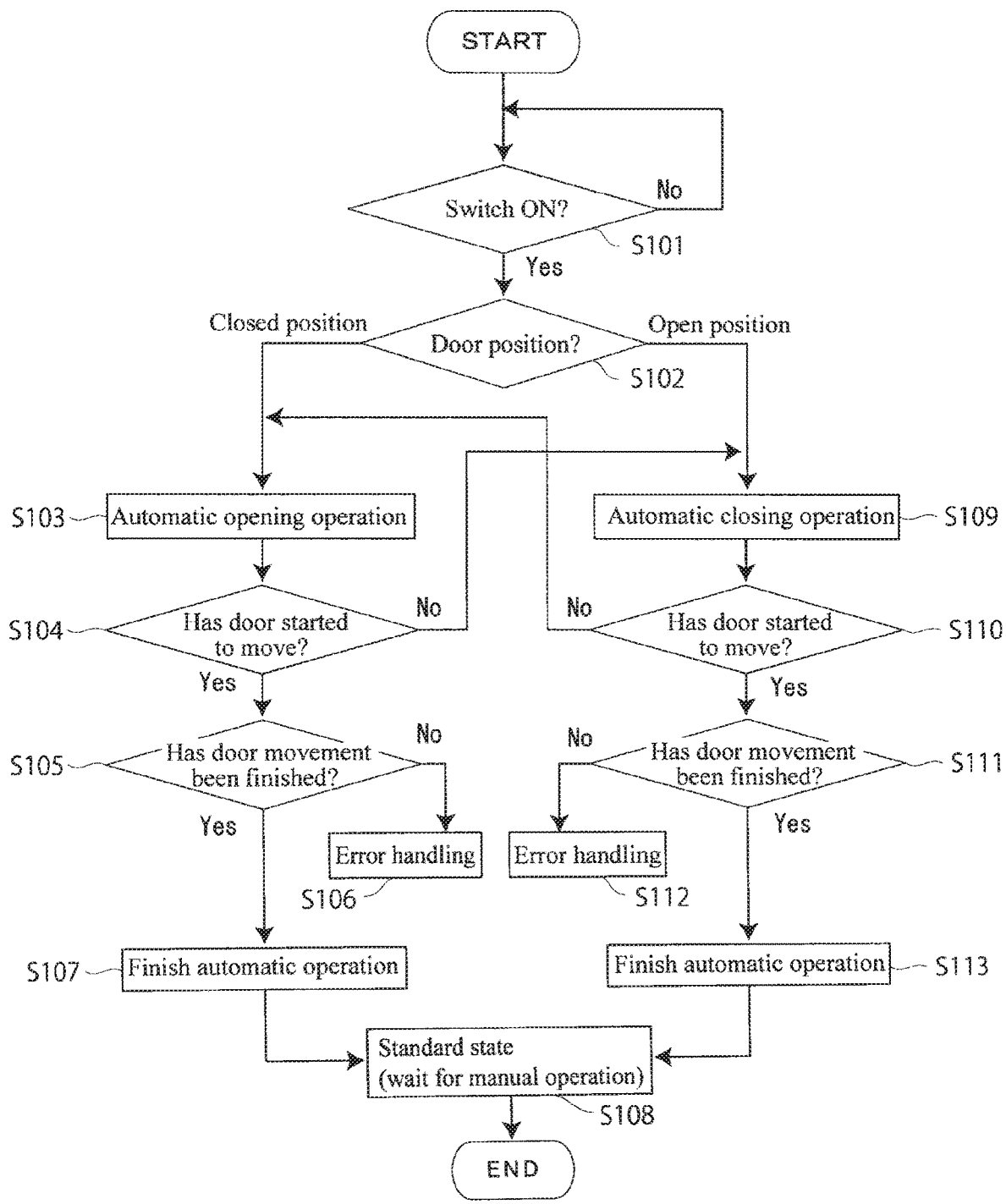
FIG. 17 is a flowchart of door opening and closing operations according to the first embodiment.

Next, a flow of opening and closing operations of the door 11 is described with reference to the flowchart in FIG. 17.

In Step S101, from the infrared sensor 36 of the control panel 35, which is a switch to open and close the door 11, a command signal to open/close the door 11 is input. When the signal is not input, the mechanism waits until the signal is input.

When a command is input, the process shifts to Step S102, and whether the door position is at a closed position or an open position is checked. In the present embodiment, the control unit 34 keeps a last opening/closing operation of the door 11 in memory, and makes determination according to the content. A configuration is also possible in which a position sensor is provided to check the position of the door 11.

First, a case where the door 11 is at the closed position (Steps S103 to S108) is described.

The process shifts to Step S103, and in order to open the door 11 that is at the closed position, the "automatic opening operation" for the door 11 is performed. In detail, the second one-way solenoid valve 66B is closed, and operation of the second pressurization pump 62B is started. At this time, the first one-way solenoid valve 66A is left open, and the first pressurization pump 62A is not activated (refer to FIGS. 15 and 16).

Next, the process shifts to Step S104, and whether the door 11 has started to move is checked. When the door 11 starts to move, the air pressure rapidly decreases, so that when a value of the second pressure sensor 64B rapidly decreases within a predetermined time, for example, within one second, it is determined that the door 11 has started an opening operation. When the door 11 does not start to move within the predetermined time, the control unit 34 determines that "door 11 has already been opened," and the process shifts to Step S109, and then, the "automatic closing operation" is started (described later). Alternatively, when a value of the second pressure sensor 64B exceeds a predetermined value, it is also possible to determine that the door has not started to move. A last position of the door 11 is kept in memory, however, in the present embodiment, manual opening and closing are also possible, and the position of the door 11 is moved by a user in some cases. Against such a case or an erroneous determination of the door 11 position, security is provided by this Step S104.

When movement of the door 11 is started, the process shifts to Step S105, and whether the opening operation of the door 11 has been finished is checked. When the movement of the door 11 is completed, the air pressure increases again, and when a value of the second pressure sensor 64B increases again within a predetermined time, it is determined that the opening operation of the door 11 has been finished. When the value of the second pressure sensor 64B does not increase within the predetermined time, air leakage or malfunction is suspected, so that to perform error handling, the process shifts to Step S106.

In Step S106, as the error handling, a warning tone is produced, an error is displayed on the display unit 38, the operation of the second pressurization pump 62B is stopped, the second one-way solenoid valve 66B is opened, and the mechanism is brought to an emergency stop.

When completion of the opening operation of the door 11 is confirmed according to an air pressure increase, the process shifts to Step S107, the operation of the second pressurization pump 62B is stopped, the second one-way solenoid valve 66B is opened, and the automatic operation is normally finished.

Last, the process shifts to Step S108, the mechanism returns to the standard state, and manual opening and closing are enabled.

Next, a case (S109 to S113) where the door 11 is at the open position in Step S102 is described.

The process shifts to Step S109, and in order to close the door 11 that is at the open position, the "automatic closing operation" of the door 11 is performed. In detail, the first one-way solenoid valve 66A is closed, and operation of the first pressurization pump 62A is started. At this time, the second one-way solenoid valve 66B is left open, and the second pressurization pump 62B is not activated (refer to FIGS. 15 and 16).

Next, the process shifts to Step S110, and whether the door 11 has started to move is checked. As in Step S104, when a value of the first pressure sensor 64A rapidly decreases within a predetermined time, it is determined that the door 11 has started a closing operation. When the door 11 does not start to move within the predetermined time, the control unit 34 determines that "the door 11 has already been closed," and the process shifts to Step S103, and then, the "automatic opening operation" is started. Like Step S104, this step S110 also provides security against a case where the door 11 position is moved by manual opening and closing and an erroneous determination.

When movement of the door 11 is started, the process shifts to Step S111, and whether the closing operation of the door 11 has been finished is checked. Completion of the movement of the door 11 is determined when the value of the first pressure sensor 64A increases again within a predetermined time. When the value of the first pressure sensor 64A does not increase within the predetermined time, to perform error handling again, the process shifts to Step S112. When completion of the door closing operation is confirmed according to an increase in value of the first pressure sensor 64A within the predetermined time, the process shifts to Step S113.

In Step S112, as error handling, a warning tone is produced, an error is displayed on the display unit 38, the operation of the first pressurization pump 62A is stopped, the first one-way solenoid valve 66A is opened, and the mechanism is brought to an emergency stop.

When an increase in value of the first pressure sensor 64A within the predetermined time is confirmed, the process shifts to Step S113, the operation of the first pressurization pump 62A is stopped, and the first one-way solenoid valve 66A is opened.

Last, the process shifts to step S108, the mechanism returns to the standard state, and manual opening and closing are enabled.

Step S111 and Step S105 double as a safety function to prevent finger pinching, etc. When the door 11 is about to be automatically closed or opened, even if one of the operator's fingers is pinched in the door 11, a specimen or the like is caught in the door 11, or trouble occurs in the movement of the door 11 and the movement is forcibly stopped, the air pressure increases, so that this air pressure increase is detected by the first pressure sensor 64A (or the second pressure sensor 64B), and the operation of the door 11 is immediately stopped, both of the one-way solenoid valves (66A and 66B) are made to communicate with the atmosphere, and the load on the door 11 is eliminated, and safety is secured.

Effect of Release to Atmosphere

When one pressurization pump operates, the other pressurization pump does not operate, and only one solenoid valve is closed, and the other solenoid valve is opened and communicates with the atmosphere. When the pump that has been operating stops, the closed solenoid valve opens and communicates with the atmosphere. In other words, all of the one-way solenoid valves are configured to open and communicate with the atmosphere when the pressurization pumps stop. After the door 11 is automatically opened/closed, air is released to the atmosphere, and the load on the door 11 is eliminated, and it becomes possible to smoothly manually move the door 11. The door 11 is automatically openable and closable, however, after it is automatically opened/closed, manual opening and closing are enabled immediately without a special operation. A mechanism to disconnect the drive source and the drive mechanism for manual/automatic switching and an operation therefor itself are unnecessary, so that extremely high usability is obtained.

When the door is opened/closed by using resistance of rubber as in the case of using a conventional mechanism, for example, a pulley or the like, a problem occurs in which even when the door is to be manually opened, the door is heavy or cannot be opened due to a load (sliding resistance) caused by interlock of the rubber with the drive source. In the present embodiment, as a door 11 opening and closing mechanism, an air cylinder is employed, and after finishing opening and closing, all of the valves are opened to communicate with the atmosphere, so that no air pressure is applied and the door can be opened and closed smoothly, and even when the door is manually opened/closed, there is no risk of breakage and malfunction.

The door can be manually opened and closed, so that the door 11 can be stopped at an arbitrary position, and the degree of freedom in use is high. Even when the door 11 is at a halfway position, according to an input of a command from the infrared sensor 36, the door 11 is closed or opened.

Also when the door opening and closing mechanism malfunctions or degrades with age, the door cannot be opened or closed with a conventional mechanism, however, by using the air cylinder 40, even when a packing to prevent air leakage degrades with age, only the door opening and closing speed decreases due to the air leakage, and even when malfunction occurs, manual opening and closing are possible, and this is highly convenient.

When weighing is to be performed by using a space around the balance main body 30, the windshield 10 can be detached, and when the windshield 10 is attached to the balance main body 30, the doors 11 of the windshield can be opened and closed either automatically or manually, so that the degree of freedom for use is high.

The mechanism is also configured so that by switching between the "automatic opening operation" and the "automatic closing operation" according to monitoring of the air pressure, opening/closing of the doors 11 is secured even when an erroneous operation occurs or the door 11 is at a halfway position, and the automatic opening operation or automatic closing operation is stopped when an abnormality occurs, and therefore, a high degree of safety and a high degree of usability are obtained.

Second Embodiment

Figure 18:
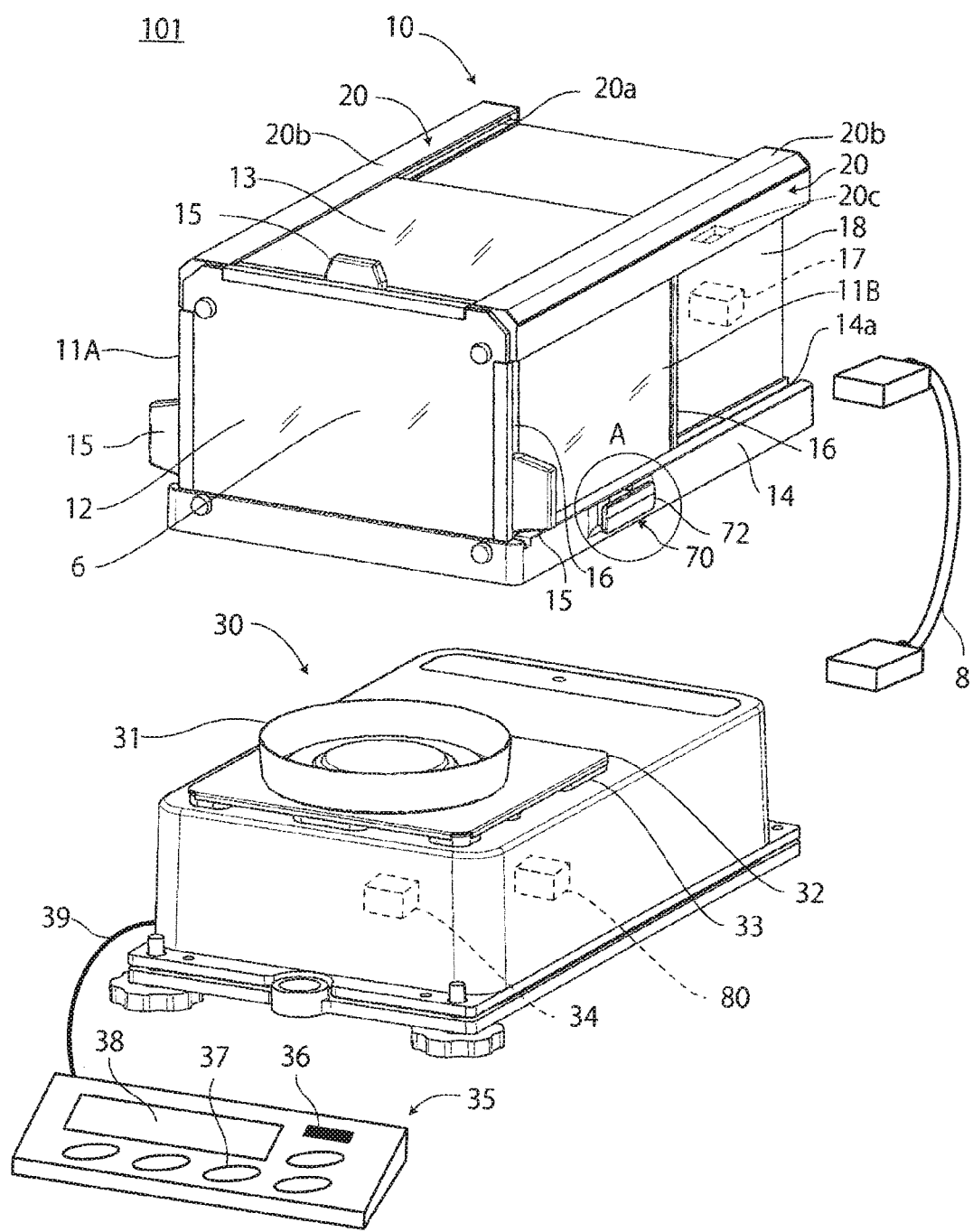
FIG. 18 is a perspective view of an electronic balance with a windshield according to a second embodiment.
Figure 19:
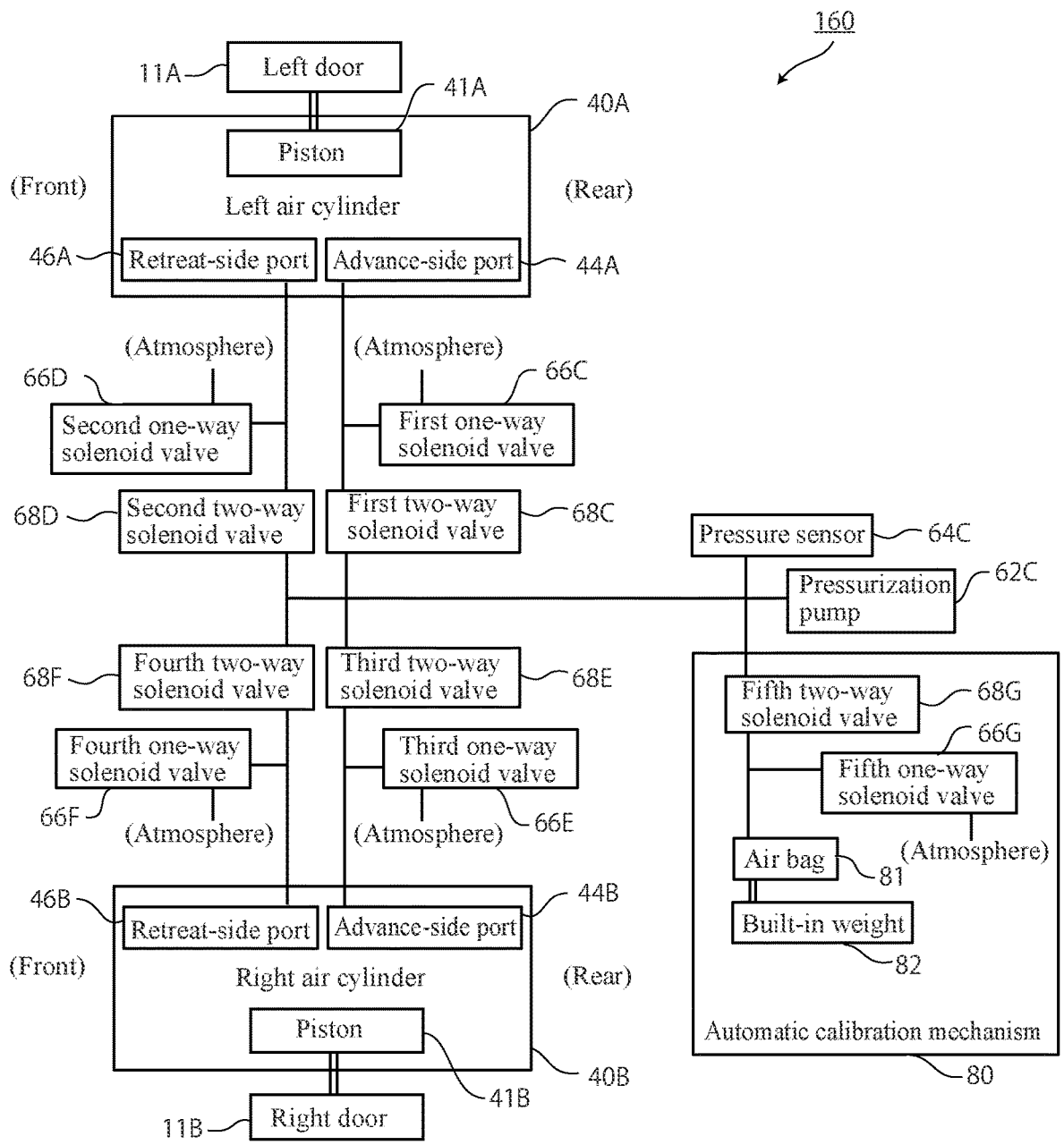
FIG. 19 is a block diagram of a door opening and closing mechanism according to the second embodiment.

FIG. 18 is a perspective view of a balance 101 with a windshield according to a second embodiment. FIG. 19 is a block diagram of an opening and closing mechanism 160 of the balance 101 with a windshield according to the second embodiment.

The balance 101 with a windshield according to the second embodiment is configured in common with the electronic balance 1 with a windshield according to the first embodiment except that the balance 101 with a windshield includes an automatic calibration mechanism 80 that performs automatic calibration inside the balance main body 30 and that the configuration of the opening and closing mechanism 160 serving as a mechanism to automatically open and close the door is different. Unlike the opening and closing mechanism 60 of the first embodiment, the opening and closing mechanism 160 of the present embodiment serving as a mechanism to open and close the door is provided not independently between the left and the right. Therefore, left and right doors are described as a left door 11A and a right door 11B. Left and right air cylinders for opening and closing these doors are distinguished as a left air cylinder 40A and a right air cylinder 40B. Each of the air cylinders (40A/40B) includes a retreat-side port (46A/46B) and an advance-side port (44A/44B) to take in air, and a piston (41A/41B).

As illustrated in FIG. 19, the left air cylinder 40A and the right air cylinder 40B shares one pressurization pump 62C as a drive source. One pressure sensor 64C monitors the pressure of air discharged from the pressurization pump 62C. Outlet sides of all of five one-way solenoid valves (66C, 66D, 66E, 66F, and 66G) are opened to the atmosphere. Two-way solenoid valves (68C, 68D, 68E, 68F, and 68G) provided in the present embodiment each have two connect ports, and inlet sides are each connected to the pressurization pump 62C, and outlet sides are each connected to the left air cylinder 40A, the right air cylinder 40B, or an air bag 81 to control the flow and stoppage of air.

To the advance-side port 44A provided at the rear side of the left air cylinder 40A, the first two-way solenoid valve 68C is connected. This connection has a branch halfway, and the first one-way solenoid valve 66C is also connected. To the retreat-side port 46A provided at the front side of the left air cylinder 40A, the second two-way solenoid valve 68D is connected, and this connection has a branch halfway, and the second one-way solenoid valve 66D is also connected.

In the right air cylinder 40B, in the same manner as described above, to the advance-side port 44B provided at the rear side, the third two-way solenoid valve 68E and the third one-way solenoid valve 66E are connected, and to the retreat-side port 46B provided at the front side, the fourth two-way solenoid valve 68F and the fourth one-way solenoid valve 66F are connected.

The automatic calibration mechanism 80 automatically calibrates the balance 101 with a windshield by loading and unloading a built-in weight 82 onto and from the balance by inflation and deflation of the air bag 81. Automatic calibration using an air bag is disclosed in detail in Japanese Published Unexamined Patent Application No. 2008-032610. To the air bag 81, the fifth two-way solenoid valve 68G and the fifth one-way solenoid valve 66G are connected.

FIG. 20 illustrates operations of the respective components to operate the left door 11A, the right door 11B, and the built-in weight 82 of the automatic calibration mechanism 80.

As illustrated in FIG. 20, in a "standard state" where the respective functions are not activated at all, the pressurization pump 62C does not operate, and all of the one-way solenoid valves (66C, 66D, 66E, 66F, and 66G) are opened, and all of the two-way solenoid valves (68C, 68D, 68E, 68F, and 68G) are closed. In this state, both of the left door 11A and the right door 11B can be manually opened and closed.

First, automatic opening and closing of the left door 11A are described. In the case of an "automatic opening operation" of the left door 11A, that is, when the piston 41A (and the left door 11A connected to this piston) is moved rearward, the second one-way solenoid valve 66D is closed, the second two-way solenoid valve 68D is opened, and pressurization of the pressurization pump 62 is started. At this time, air passes through the opened second two-way solenoid valve 68D, and the piston 41A is moved rearward by an air pressure, and the left door 11A is opened.

When the left door 11A fully opens, the air pressure rapidly increases, so that when this change is detected by the pressure sensor 64C, the pressurization pump 62C is stopped, the second two-way solenoid valve 68D is closed, the second one-way solenoid valve 66D is opened, compressed air inside the left air cylinder 40A is released to the atmosphere, the pressure inside the left air cylinder 40A decreases to the atmospheric pressure, and the mechanism returns to the standard state.

In the case of an "automatic closing operation" of the left door 11A, that is, when the piston 41A (and the left door 11A connected to this piston) is moved forward, the first one-way solenoid valve 66C is closed, the first two-way solenoid valve 68C is opened, and pressurization of the pressurization pump 62C is started. Air passes through the opened first two-way solenoid valve 68C, and by the air pressure, the piston 41A is moved forward, and the left door 11A is closed.

When the left door 11A fully closes, the air pressure rapidly increases, so that when this change is detected by the pressure sensor 64C, the pressurization pump 62C is stopped, the first two-way solenoid valve 68C is closed, the first one-way solenoid valve 66C is opened, and compressed air inside the left air cylinder 40A is released to the atmosphere, and the pressure inside the left air cylinder 40A decreases to the atmospheric pressure, and the mechanism returns to the standard state.

The same applies to the right door 11B, and an "automatic opening operation" and an "automatic closing operation" are performed through the same operations in which the left air cylinder 40A corresponds to the right air cylinder 40B, the piston 41A corresponds to the piston 41B, the first one-way solenoid valve 66C corresponds to the third one-way solenoid valve 66E, the first two-way solenoid valve 68C corresponds to the third two-way solenoid valve 68E, the second two-way solenoid valve 68D corresponds to the fourth two-way solenoid valve 68F, and the second one-way solenoid valve 66D corresponds to the fourth one-way solenoid valve 66F.

Further, an operation of the automatic calibration mechanism 80 when the control unit 34 receives a command to automatically calibrate the balance is as follows.

First, in order to inflate the air bag 81 and load the built-in weight 82 onto the balance, all of the one-way solenoid valves (66C, 66D, 66E, 66F, and 66G) are closed, the fifth two-way solenoid valve 68G is opened, and pressurization of the pressurization pump 62C is started. Other two-way solenoid valves (68C, 68D, 68E, and 57F) connected to the pressurization pump 62C are all closed, so that air passes through the fifth two-way solenoid valve 68G and inflates the air bag 81. By the inflation of the air bag 81, the built-in weight 82 is loaded onto the balance. When the air bag 81 is fully inflated, the air pressure rapidly increases, so that when this is detected by the pressure sensor 64C, the pressurization pump 62C is stopped.

When the built-in weight 82 with a known mass is weighed and the calibration process ends, then, in order to unload the built-in weight 82 from the balance, the fifth one-way solenoid valve 66G is opened, and the fifth two-way solenoid valve 68G is closed. Accordingly, when the air that inflated the air bag 81 passes through the fifth one-way solenoid valve 66G and is released to the atmosphere, the air bag 81 gradually deflates, and the built-in weight 82 is unloaded from the balance. The remaining one-way solenoid valves (66C, 66D, 66E, and 66F) are opened, and the mechanism returns to the standard state.

During the calibration operation, all of the one-way solenoid valves (66C, 66D, 66E, 66F, and 66G) are closed, so that air cannot move, and the left door 11A and the right door 11B are locked. When the calibration operation ends, the left door 11A and the right door 11B are unlocked, and become manually openable and closable.

By locking the doors during automatic calibration, the operator is prevented from opening the left door 11A or the right door 11B by mistake without noticing automatic calibration, and causing influence on calibration.

In the balance 101 with a windshield according to the second embodiment, the pressurization pump 62C is used as a drive source shared by the left and right air cylinders (30A and 30B), and accordingly, the number of components can be reduced to be less than in the first embodiment, and the cost can be reduced. A pressurization pump as a drive source that raises and lowers a built-in weight incorporated in the balance at the time of automatic calibration, and the pressurization pump 62C, are configured as a shared one, and accordingly, the number of components can be further reduced.

Third Embodiment

Figure 21:
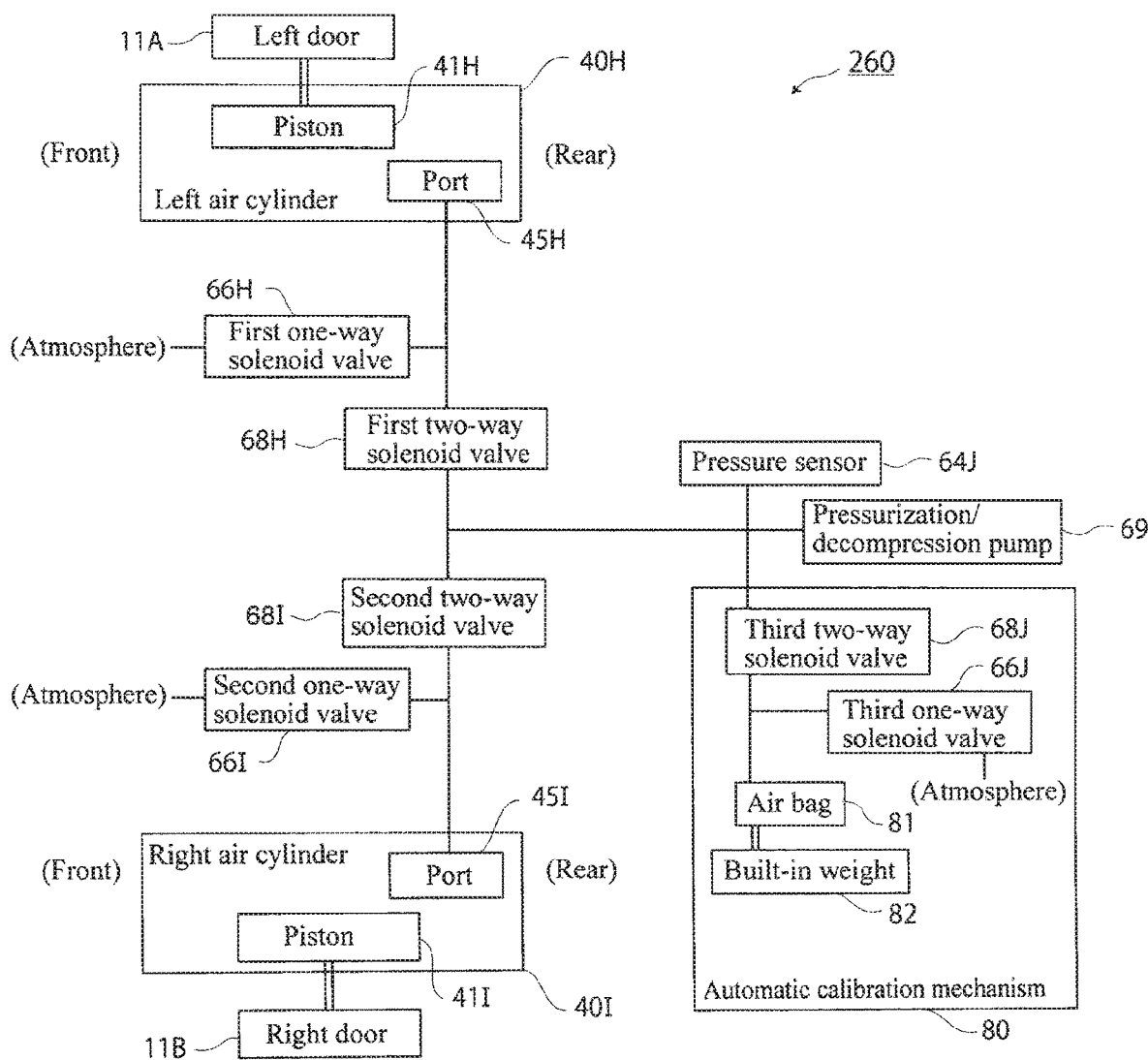
FIG. 21 is a block diagram of a door opening and closing mechanism according to a third embodiment.

FIG. 21 is a block diagram of an opening and closing mechanism 260 for a balance 201 with a windshield according to a third embodiment. The balance 201 with a windshield is configured in common with the balance 101 with a windshield according to the second embodiment except that an opening and closing mechanism 260 is different.

As illustrated in FIG. 21, the opening and closing mechanism 260 of the balance 201 with a windshield includes a right air cylinder 40I to open and close the right door 11B, a left air cylinder 40H to open and close the left door 11A, and an automatic calibration mechanism 80. A common drive source shared by these components is a pressurization/decompression pump 69.

The pressurization/decompression pump 69 can perform both pressurization and decompression of air. The right air cylinder 40I and the left air cylinder 40H are double-acting air cylinders for the pressurization/decompression pump, and each of the air cylinders is provided with only one port (45I/45H) at the rear side. In response to pressurization of the pressurization/decompression pump 69, a piston 41H inside the left air cylinder 40H moves forward and the left door 11A closes, and in response to decompression of the pressurization/decompression pump 69, the piston 41H moves rearward and the left door 11A opens. The same applies to the right air cylinder 40I.

The pressure sensor 64J monitors an air pressure inside a connected air tube to prevent the air pressure from becoming equal to or more than a set upper limit value or becoming equal to or lower than a set lower limit value. Outlet sides of all of the three one-way solenoid valves (66H, 66I, and 66J) are opened to the atmosphere. Each of the two-way solenoid valves (68H, 68I, and 68J) has two connect ports, and the inlet sides are connected to the pressurization/decompression pump 69, and the outlet sides are connected to the left air cylinder 40H, the right air cylinder 40I, and the air bag 81, respectively, to control the flow and stoppage of air.

To the port 45H of the left air cylinder 40H, the first two-way solenoid valve 68H is connected. This connection has a branch halfway, and the first one-way solenoid valve 66H is also connected. Similarly, to the port 45I of the right air cylinder 40I, the second two-way solenoid valve 68I and the second one-way solenoid valve 66I are connected in the same manner. To the air bag 81 of the automatic calibration mechanism 80, the third one-way solenoid valve 66J and the third two-way solenoid valve 68J are connected.

FIG. 22 illustrates operations of the respective components to operate the left door 11A, the right door 11B, and the built-in weight 82 of the automatic calibration mechanism 80.

In a standard state where the respective functions are not activated at all, the pressurization/decompression pump 69 does not operate, and all of the two-way solenoid valves (68H, 68I, and 68J) are closed, and all of the one-way solenoid valves (66H, 66I, and 66J) are opened so as to be open to the atmosphere. In this state, both of the left door 11A and the right door 11B can be manually opened and closed.

First, automatic opening and closing of the left door 11A are described. In the case of an "automatic opening operation" of the left door 11A, that is, when the piston 41H (and the left door 11A connected to this piston) inside the left air cylinder 40H is moved rearward, the first one-way solenoid valve 66H is closed, the first two-way solenoid valve 68H is opened, and decompression of the pressurization/decompression pump 69 is started. Accordingly, the pressure inside the left air cylinder 40H becomes low, and the piston 41H moves rearward and the left door 11A is opened.

When the left door 11A is opened, the air pressure rapidly decreases, so that when this decrease is detected by the pressure sensor 64J, the pressurization/decompression pump 69 is stopped, the first two-way solenoid valve 68H is closed, and the first one-way solenoid valve 66H is opened, and the mechanism returns to the standard state.

In the case of an "automatic closing operation" of the left door 11A, that is, when the piston 41H is moved forward, the first one-way solenoid valve 66H is closed, the first two-way solenoid valve 68H is opened, and pressurization of the pressurization/decompression pump 69 is started. Accordingly, the pressure inside the left air cylinder 40H becomes high, and the piston 41H is pushed forward by an air pressure, and the left door 11A is closed.

When the left door 11A is closed, the air pressure rapidly increases, so that when this increase is detected by the pressure sensor 64J, the pressurization/decompression pump 69 is stopped, the first two-way solenoid valve 68H is closed, the first one-way solenoid valve 66H is opened, and the mechanism returns to the standard state.

An "automatic opening operation" and an "automatic closing operation" of the right door 11B are the same as described above, and are performed through the same operations in which the left air cylinder 40H corresponds to the right air cylinder 40I, the first one-way solenoid valve 66H corresponds to the second one-way solenoid valve 66I, and the first two-way solenoid valve 68H corresponds to the second two-way solenoid valve 68I.

Further, an operation of the automatic calibration mechanism 80 to be performed when the control unit 34 receives a command to automatically calibrate the balance is as follows.

First, in order to inflate the air bag 81 and load the built-in weight 82 onto the balance, all of the one-way solenoid valves (66H, 66I, and 66J) are closed, the third two-way solenoid valve 68J is opened, and pressurization of the pressurization/decompression pump 69 is started. Since other two-way solenoid valves (68H and 68I) connected to the pressurization/decompression pump 69 are closed, when air passes through the third two-way solenoid valve 68J and inflates the air bag 81, due to the inflation of the air bag 81, the built-in weight 82 is loaded onto the balance. When the air bag 81 is fully inflated, the air pressure rapidly increases, so that when this increase is detected by the pressure sensor 64J, the pressurization/decompression pump 69 is stopped.

When the built-in weight 82 with a known mass is weighed and the calibration process ends, then, in order to unload the built-in weight 82 from the balance, the third one-way solenoid valve 66J is opened, and the third two-way solenoid valve 68J is closed. Accordingly, when the air that inflated the air bag 81 passes through the third one-way solenoid valve 66J and is released to the atmosphere, the air bag 81 gradually deflates, and the built-in weight 82 is unloaded from the balance. The remaining one-way solenoid valves (66H and 66I) are opened, and the mechanism returns to the standard state.

During the calibration operation, all of the one-way solenoid valves (66H, 66I, and 66J) are closed, so that air cannot move, and the left and right doors (11A and 11B) are locked. When the calibration operation ends, the left and right doors (11A and 11B) are unlocked, and become manually openable and closable.

By using the pressurization/decompression pump 69 as a common drive source for the respective components of the balance 201 with a windshield, the number of components can be reduced to be further less than that of the balance 101 with a windshield of the second embodiment and assembly man-hours can be reduced.

Modifications

Preferred modifications with respect to the embodiments described above are described. The same components as in the embodiments described above are provided with the same reference signs, and descriptions of these are omitted.

Figure 23:
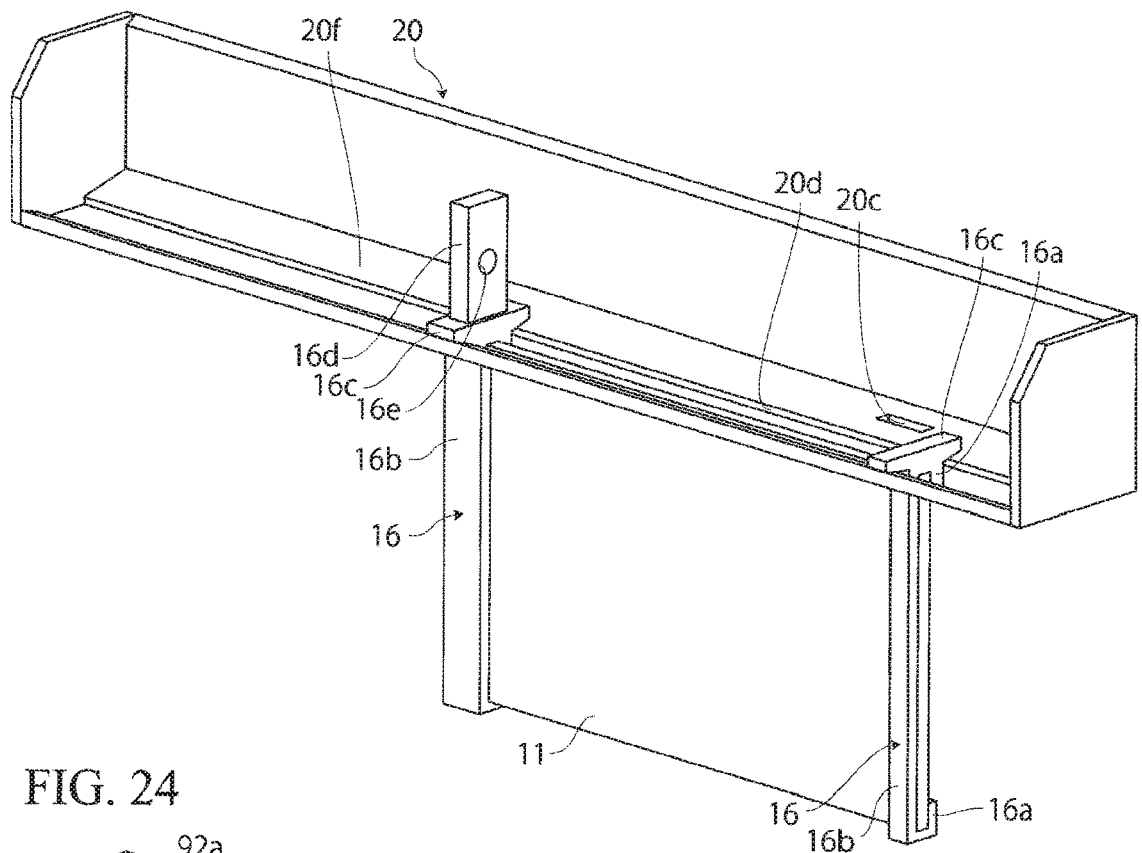
FIG. 23 is an example of a modification.

FIG. 23 illustrates a modification of shapes of the cylinder box 20 and the holder 16. A bottom surface 20f of the cylinder box 20 which serves as an engagement surface to engage with the door 11 is inclined toward the guide hole 20d. A bottom surface of the flange portion 16c which serves as an engagement surface to engage with the cylinder box 20 is formed to be inclined at the same angle as the angle of the bottom surface 20f. The inclination angles of the bottom surfaces 20f (and the bottom surface of the flange portion 16c) at the left and right of the guide hole 20d are equal to each other, and the door 11 maintains a substantially vertical posture. Due to the inclination of the engagement surface toward the guide hole 20d, the door 11 easily maintains its posture in the vertical direction.

Figure 24:
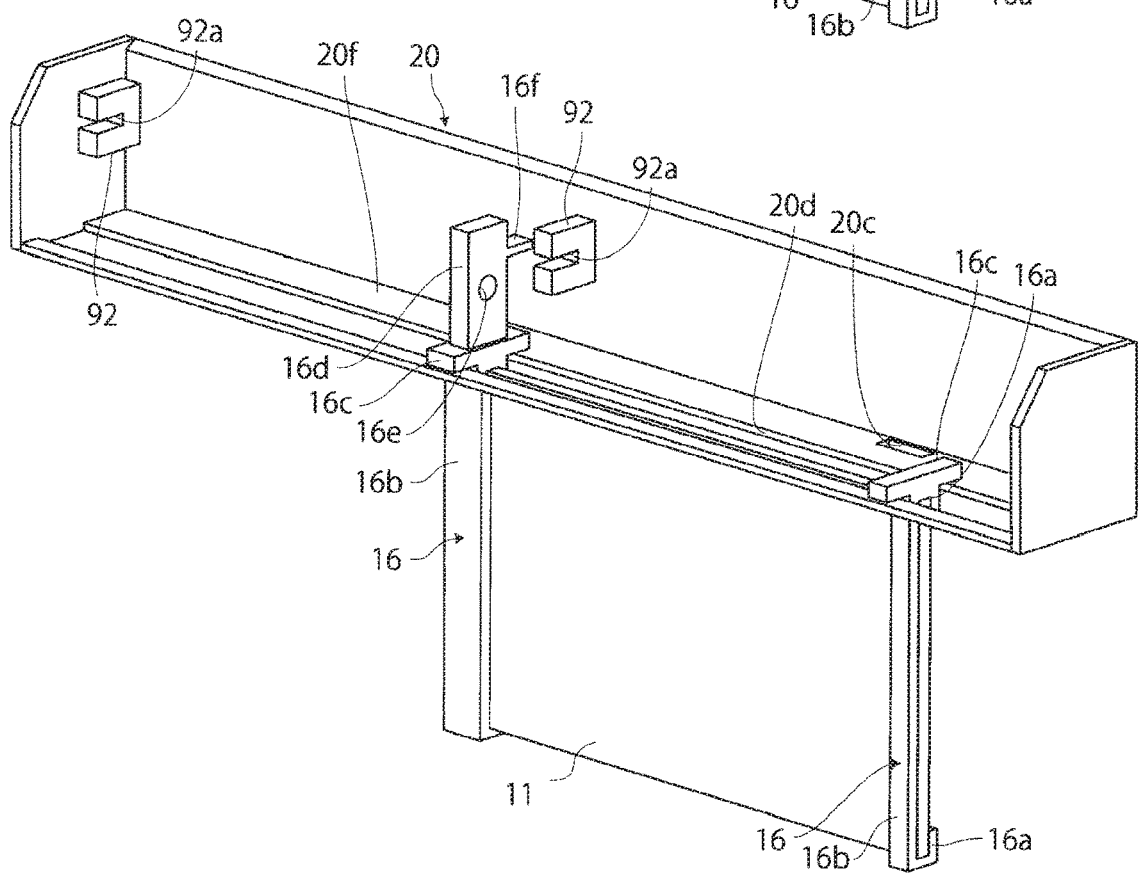
FIG. 24 is an example of a modification.

FIG. 24 is a modification in which, for door position detection, position sensors are used instead of the pressure sensors. At the fully opened position and the fully closed position of the door 11, photointerrupters 92 are provided as position sensors. Each photointerrupter 92 has a slit 92a, and in alignment with the position of the slit 92a, a projection portion 16f is formed on the coupling portion 16d of the holder 16. In the slit 92a, a light emitting unit and a light receiving unit facing each other are provided, and by detecting, by the light receiving unit, interruption of light from the light emitting unit by the projection portion 16f, a position of the door 11 is checked.

The pressurization pumps (62A and 62B) are interlocked with the photointerrupters 92, and stop when receiving a signal indicating that the projection portion 16f arrives at the position of the photointerrupter 92. With this configuration, the door 11 can be stopped at an accurate position.

Embodiments and modifications of the present invention have been described above, and the embodiments and modifications can be combined based on knowledge of a person skilled in the art, and such a combined embodiment is included in the scope of the present invention.

REFERENCE SIGNS LIST 1, 101, 201 Balance with windshield
6 Weighing chamber
10 Windshield
11 Door
11A Left door
11B Right door
14 Frame
16 Holder
16c Flange portion
17 Power chamber
19 Engagement hole
20 Cylinder box
20d Guide hole
20e Bottom surface
30 Balance main body
31 Weighing pan
32 Floor member
34 Control unit
35 Control panel
40 Air cylinder
44, 46 Port
60, 160, 260 Opening and closing mechanism
62 Pressurization pump
64A to 64C, 64J Pressure sensor
66 One-way solenoid valve
68 Two-way solenoid valve
70 Attaching and detaching mechanism
72 Engagement member
S101 to S113 Step

The invention claimed is:

1. An electronic balance comprising:
a balance main body including a weighing mechanism connected to a weighing pan;
a windshield having a door capable of opening and closing by sliding, and configured to form configured to form a weighing chamber by covering the weighing pan; and
an actuator configured to open and close the door, wherein the actuator includes
a double-acting type air cylinder having two ports serving as air intake ports;
an air pump to be connected to the two ports;
two valves respectively interposed between the air pump and the two ports and configured to make the ports communicate with and shut off from the atmosphere; and
a control device configured to control the two valves to make the two ports communicate with the atmosphere when the air pump is stopped.

2. The electronic balance according to claim 1, further comprising:
a pressure sensor configured to monitor a pressure of air discharged from the air pump, wherein
the control device is configured to perform control so as to stop the air pump and make the two ports communicate with the atmosphere when the pressure sensor detects a rapid increase in air pressure.

3. The electronic balance according to claim 1, further comprising:
a pressure sensor configured to monitor a pressure of air discharged from the air pump, wherein
the control device is configured to control the two valves, in a case where the pressure sensor does not detect a decrease in air pressure within a predetermined time when the air pump is activated with one of the two ports being made to communicate with the atmosphere and the other one port being made to shut off from the atmosphere, so as to reverse the communication with the atmosphere and communication shut-off from the atmosphere of the two ports.

4. The electronic balance according to Claim 1, wherein a power chamber partitioned and separated from the weighing chamber is formed in the windshield, and the air pump and the two valves are disposed inside the power chamber.

5. The electronic balance according to Claim 1, wherein the door is hung and supported from an upper portion, and the air cylinder is disposed above the door and connected to a door hanging portion.

6. The electronic balance according to Claim 1, wherein the control device is configured to control the valves so that communication of the two ports with the atmosphere is shut off during calibration of the balance main body.

7. The electronic balance according to Claim 1, wherein the control device is configured to control the valves so that communication and shutting-off between the two ports and the atmosphere are switched according to a command input.

* * * * *